United States Patent [19]

Murata et al.

[11] Patent Number: 4,509,820
[45] Date of Patent: Apr. 9, 1985

[54] PROTECTIVE PACKAGING ASSEMBLY AND METHOD

[75] Inventors: Norio Murata; Mitsutoshi Hoshino, both of Mito; Shinzo Yamakawa, Katsuta, all of Japan

[73] Assignee: Nippon Telegraph & Telephone Public Corporation, Tokyo, Japan

[21] Appl. No.: 373,033

[22] Filed: Apr. 28, 1982

[30] Foreign Application Priority Data

| May 7, 1981 | [JP] | Japan | 56-67605 |
| Jul. 10, 1981 | [JP] | Japan | 56-106895 |
| Jul. 17, 1981 | [JP] | Japan | 56-110779 |
| Nov. 5, 1981 | [JP] | Japan | 56-176508 |
| Nov. 5, 1981 | [JP] | Japan | 56-176509 |
| Jan. 25, 1982 | [JP] | Japan | 57-9846 |

[51] Int. Cl.³ .................................. G02B 5/14
[52] U.S. Cl. ........................... 350/96.21; 156/86; 174/DIG. 8; 53/557; 219/528; 219/544
[58] Field of Search ............ 219/270, 528, 544, 545; 350/96.2 E, 96.21, 96.22; 156/84, 85, 86; 174/DIG. 8; 53/147, 203, 557; 285/21, 81; 428/35; 338/262, 275, 276; 358/901

[56] References Cited

U.S. PATENT DOCUMENTS

| 3,062,940 | 11/1962 | Bauer et al. | 285/81 X |
| 3,294,941 | 12/1966 | Mullen | 174/DIG. 8 |
| 3,349,359 | 10/1967 | Morey | 219/545 X |
| 3,691,505 | 9/1972 | Graves | 219/528 |
| 4,026,633 | 5/1977 | Crick | 350/96.21 |
| 4,107,510 | 8/1978 | Tombs et al. | 219/270 |
| 4,195,106 | 3/1980 | Brusselmans | 156/86 X |
| 4,237,609 | 12/1980 | Clabburn et al. | 174/DIG. 8 |
| 4,358,957 | 5/1983 | Wacherle et al. | 219/545 X |
| 4,362,356 | 12/1982 | Williams et al. | 350/96.21 X |

FOREIGN PATENT DOCUMENTS

| 2645991 | 4/1978 | Fed. Rep. of Germany | 350/96.21 |
| 5081175 | 1/1977 | Japan | 350/96.21 |
| 55-129305 | 3/1979 | Japan . |  |
| 54-118254 | 9/1979 | Japan | 350/96.21 |
| 55-45052 | 3/1980 | Japan | 350/96.21 |
| 55-103513 | 8/1980 | Japan | 350/96.21 |
| 56-74922 | 11/1982 | Japan | 350/96.2 |
| 56-75661 | 11/1982 | Japan | 350/96.2 |
| 58-23005 | 2/1983 | Japan | 350/96.2 |
| 58-23008 | 2/1983 | Japan | 350/96.2 |
| 58-23006 | 2/1983 | Japan | 350/96.2 |
| 58-23007 | 2/1983 | Japan | 350/96.2 |
| 1424686 | 2/1976 | United Kingdom . |  |

OTHER PUBLICATIONS

"Fusion Splicing of Optical Fibers", by J. F. Balgleish, Electronics Letters, vol. 15, No. 1, pp. 32-34, Jan. 4, 1979.

Primary Examiner—Volodymyr Y. Mayewsky
Attorney, Agent, or Firm—Spencer & Frank

[57] ABSTRACT

A protective packaging method of protecting the spliced portion of optical fibers, comprising the steps of providing a protective packaging assembly having a heat-shrinkable tube capable of shrinking in the radial direction thereof, an extended form of hot-melt adhesive disposed on the inner side of the heat-shrinkable tube, and an electrical resistance heating element so disposed on the inner side of the heat-shrinkable tube and extendedly in the axial direction of the heat-shrinkable tube as to be capable of heating both the heat-shrinkable tube and the extended form of hot-melt adhesive, and a space provided in the heat-shrinkable tube for allowing the passage of the optical fiber; placing the protective packaging assembly around the splice portion of the optical fiber which has been passed through the space; and supplying electric current through the electrical resistance heating element to heat-melt the hot-melt adhesive and to heat-shrink the heat-shrinkable tube for forming a reinforced unit including the spliced portion of the optical fiber and the electrical resistance heating element with the hot-melt adhesive acting as a sealant inside the heat-shrunk tube. A highly reliable reinforced portion is easily and rapidly formed which does not contain residual bubbles. The reinforced fiber is hardly broken and has little increase of transmission loss.

19 Claims, 31 Drawing Figures

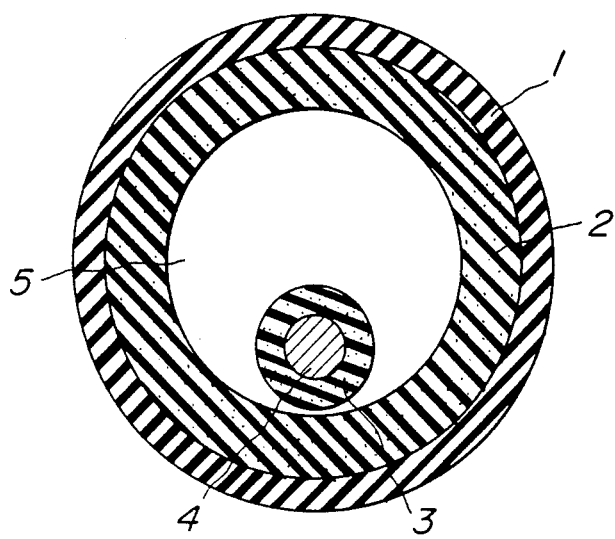
FIG_1
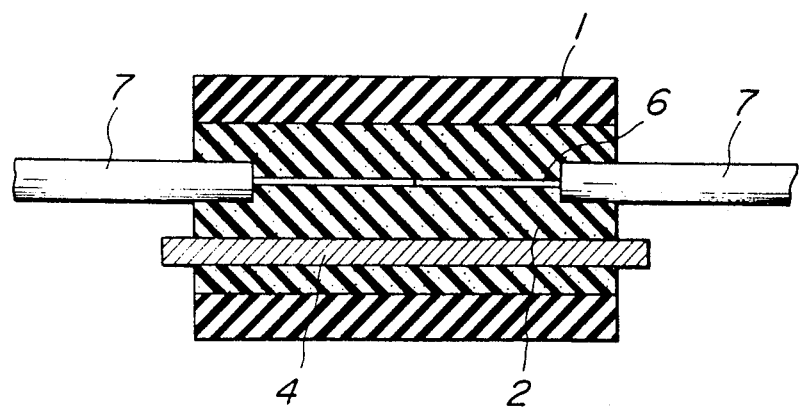
FIG_2

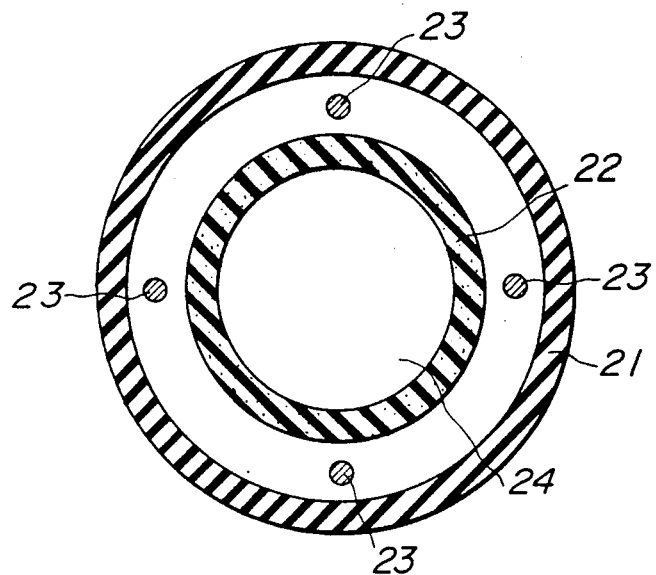
FIG_6
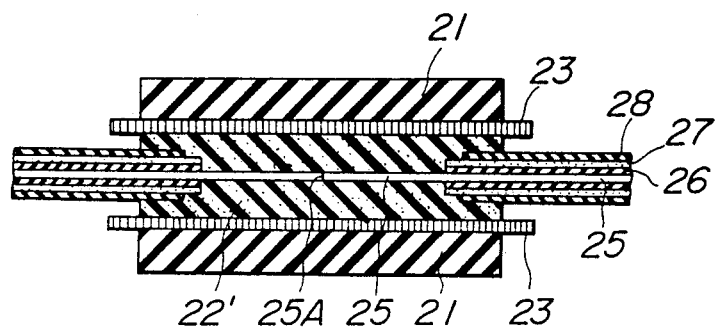
FIG_7

FIG_13
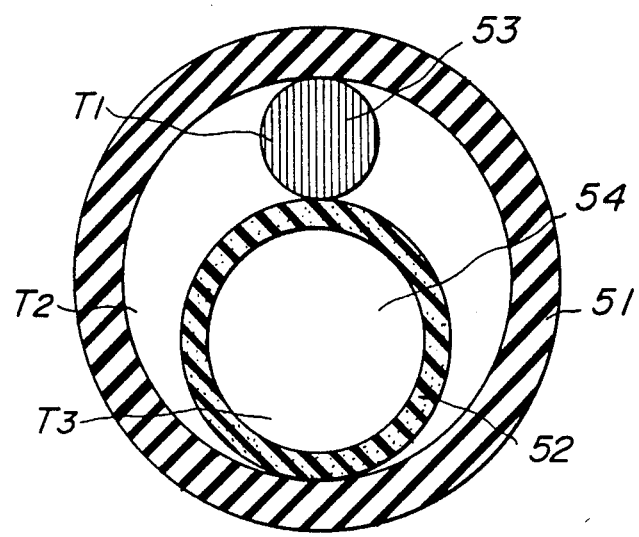
FIG_14
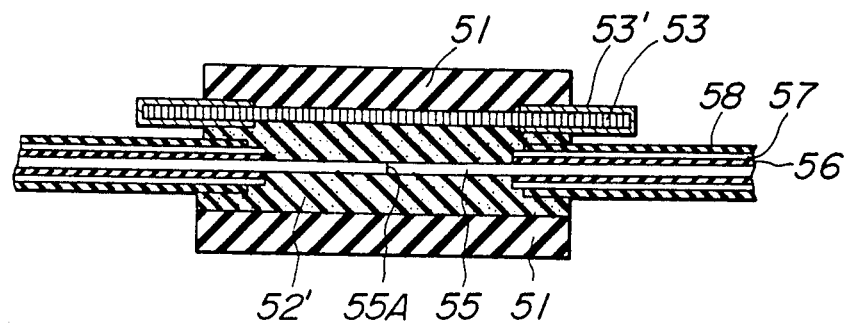

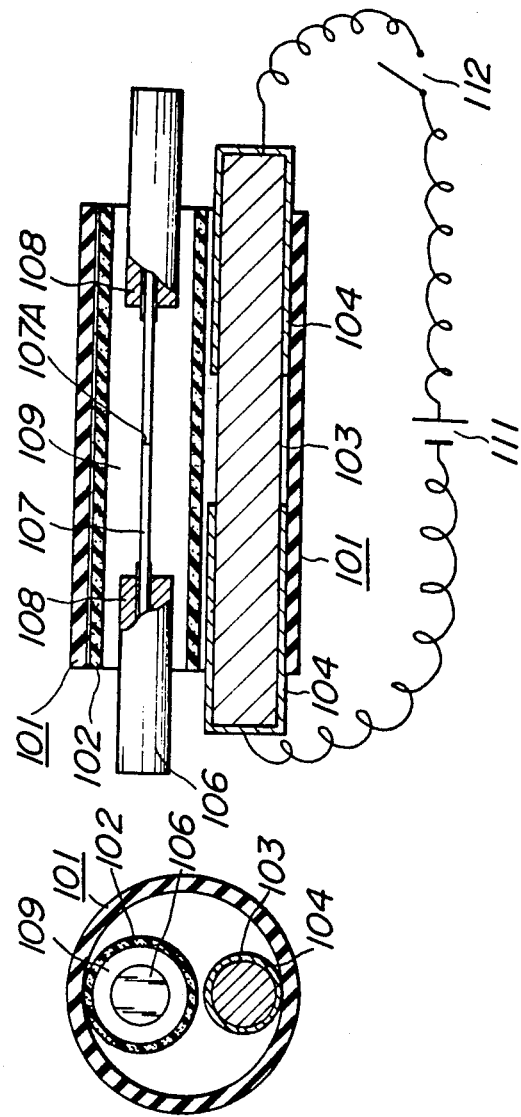

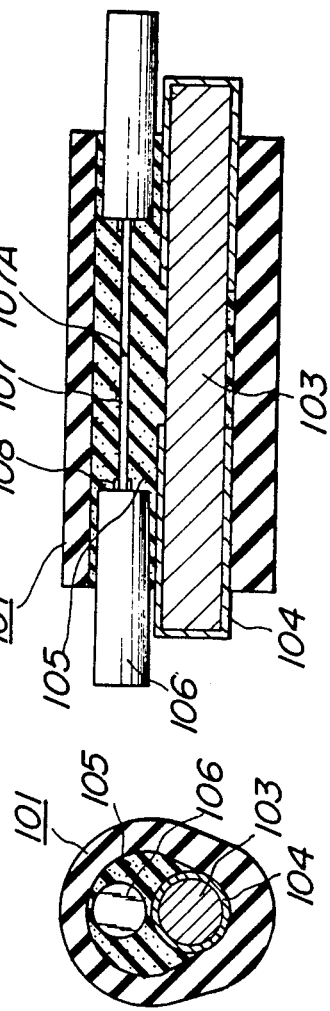

PROTECTIVE PACKAGING ASSEMBLY AND METHOD

BACKGROUND OF THE INVENTION

The present invention relates to a protective packaging or reinforcement assembly for packaging the spliced portions of optical fibers, and to a protective packaging method for protecting and reinforcing the spliced portions by the use of such a protective packaging assembly.

One of the most practical and reliable methods for optical fiber splicing is fusion splicing, comprising the steps of stripping the plastic coatings from the two fiber ends to be spliced, placing the two bare fiber ends in an end-to-end position, and of fusion splicing, such as arc splicing the bare fiber ends by a process such as arc fusion. However, this fusion splicing method needs a subsequent packaging process for protecting the completed splice since the splice has no protective coating.

Several protective packaging methods of reinforcing the spliced portion of an optical fiber have heretofore been proposed, which include those methods using a heat-shrinkable tube, such as disclosed in Japanese Patent Application Laid-Open Specification No. 129,305/1980 and in "Fusion Splicing of Optical Fibers", by J. F. Balgleish, Electronics Letter, Vol. 15, No. 1, p. 32(1979). In the prior art methods using a heat-shrinkable tube, an external heating source or device such as an electric heater must be employed to shrink the heat-shrinkable tube. Therefore, such an external heating device must be carried, for example, into a manhole or up to the top of a pole for in the field optical fiber splicing. The packaging process requires a relatively long heating time, i.e., 2–3 minutes, because the protective packaging assembly is externally heated from the outside by an external heat source. With respect to the packaging materials, the Young's moduli of the heat-shrinkable tube and any hot-melt adhesive are in the order of 1–100 kg/mm$^2$, which are much lower than the Young's modulus of an optical fiber, i.e. approximately 7,000 kg/mm$^2$. This creates a concern that the optical fiber will be broken when a tensile stress is applied to the reinforced portion of the optical fiber to elongate the packaging materials so that a breaking stress may be put on the optical fiber. Furthermore, the linear expansion coefficients of the heat-shrinkable tube and any hot-melt adhesive such as the packaging materials are in the order of $10^{-5}$ to $10^{-4}/°C$., which are higher than the linear expansion coefficient of the fused silica optical fiber, which is in the order of $10^{-7}$ to $10^{-6}/°C$. This leads to such a disadvantage that, owing to the expansion or contraction, upon temperature change, of the above-mentioned plastic packaging materials, transmission loss increase of the optical fiber due to microbending thereof and/or fiber breaking caused by protrusion of the optical fiber are liable to occur.

SUMMARY OF THE INVENTION

The present invention is to overcome the above-mentioned disadvantages of the prior protective packaging methods using a heat-shrinkable tube.

It is, therefore, an object of the present invention to provide a protective packaging assembly for the spliced portion of optical fibers which enable the protective packaging or reinforcement, in the field of the optical fiber to be easily and safely carried out in a short period of time.

Another object of the present invention is to provide a protective packaging assembly of the kind described above which can provide a packaged unit (reinforced, spliced portion of an optical fiber) which minimizes transmission loss or attenuation change and gives rise to little breaking of the optical fiber.

A further object of the present invention is to provide a protective packaging assembly of the kind described above which, during the course of packaging, can easily remove any gases and bubbles formed therein from a reinforced unit being formed, which unit, therefore, gives rise to little breaking and transmission loss increase of an optical fiber when subjected to external force as well as to temperature change, thereby achieving high reliability for a long period of time.

A still further object of the present invention is to provide a protective packaging assembly of the kind described above which can provide a reinforced unit which minimizes transmission loss increase with temperature change, of the optical fiber and gives rise to little protrusion and, hence, little breaking, with temperature change, of the optical fiber.

Yet another object of the present invention is to provide a protective packaging method for packaging or reinforcing the spliced portion of an optical fiber which, by the use of a protective packaging assembly of the kind described above, can be easily and safely practiced in a short period of time.

In accordance with one aspect of the present invention, there is provided a protective packaging assembly for the spliced portion of an optical fiber, which comprises a heat-shrinkable tube capable of shrinking in the radial direction thereof, an extended form of a hot-melt adhesive disposed on the inner side of the heat-shrinkable tube, an electrical resistance heating element so disposed on the inner side of the heat-shrinkable tube and extending in the axial direction of the heat-shrinkable tube as to be capable of heating both the heat-shrinkable tube and the extended form of hot-melt adhesive, and a space provided in the heat-shrinkable tube for allowing the passage of the optical fiber.

In the protective packaging assembly of the present invention, the extended form of hot-melt adhesive is a layer formed on the inner surface of the heat-shrinkable tube. Alternatively, the extended form of hot-melt adhesive is a tube providing the space through which an optical fiber can be passed. The electrical resistance heating element may be disposed in the form of at least one linear part between the heat-shrinkable tube and the hot-melt adhesive tube. The linear part may be used either as such or after being coated with the hot-melt adhesive. In the case of a tubular form of the electrical resistance heating element, the inner and/or outer surface of the heating element may be coated with hot-melt adhesive.

The electrical resistance heating element which may be used either as such or after being preliminarily coated with a hot-melt adhesive, and which has been provided separately from the heat-shrinkable tube may be adapted to be inserted, into the heat-shrinkable tube, together with the optical fiber and the electrical resistance heating element through which electric power is to be fed. Alternatively, the electrical resistance heating element may be formed in the hot-melt adhesive layer by, for example, coating the hot-melt adhesive on the inner surface of the heat-shrinkable tube.

The electrical resistance heating element to be used in the present invention is desired to have a Young's modulus and linear expansion coefficient, both of which are close to those of a fused silica optical fiber. Electrical resistance heating element employable in the present invention include, for example, a nichrome type alloy wire, an iron-chrome-aluminum type alloy wire, a tungsten wire, a molybdenum wire, a platinum wire, and a material including singly or mainly a silicon carbide fiber and/or a carbon fiber, which may be employed either alone or in combination, and either as such or in the form of a rod made of a bundle thereof, or a net or a tube formed therefrom. There can also be employed a composite as the electrical resistance heating element a composite of the material mentioned above with carbon, inorganic material or organic material as the material of a matrix in which the electrical resistance heating element is arranged or embedded.

The material of the hot-melt adhesive to be used in the present invention is desired to have good adhesions to a bare fiber and the plastic coating thereof, and to the electrical resistance heating element.

As the preferred material of the hot-melt adhesive to be used in the present invention, there can be mentioned, for example, polyolefins, polyamides, polyvinyl chlorides, polyesters, polyvinyl acetals, polyurethanes, polystyrenes, acrylic resins, polyvinyl esters, fluorocarbon resins, polyethers, polyacetals, polycarbonates, polysulfones, diene polymers, natural rubber, chloroprene rubbers, polysulfides, and modified products thereof. They may be used either alone or in mixture (e.g., a mixture of a plurality of polymers, a mixture of a plurality of modified products, or a mixture of at least one polymer and at least one modified product).

As the preferred material of the heat-shrinkable tube to be employed in the present invention, there can be mentioned polyethylene, ethylene copolymers or fluoropolymers, for example, polyolefins such as polyethylene, polypropylene, ethylene-propylene copolymers; polyvinyl chloride; fluoropolymers such as polyvinylidene fluoride; and silicone resins, to which the material employable is not particularly limited.

The electrical resistance heating element is preferable lower in electrical resistance at both end portions thereof than in the central portion thereof, whereby a larger amount of heat can be generated in the central portion of the heating element upon electric current being supplied therethrough as compared with that generated in each of the end portions. In the case of a protective packaging assembly including a heating element of the kind described just above, bubble formation can advantageouly be minimized during the course of the packaging procedures. The use of a heating element of this kind is especially advantageous in a protective packaging assembly of a kind comprising the heating element disposed between the heat-shrinkable tube and a tube of the hot-melt adhesive providing a space through which an optical fiber can be passed.

It is preferred that the electrical resistance heating element comprise a base rod of a heating element, and a coating of a conductive paste coated or a film of a metal vacuum-evaporated on the base rod with a characteristic resistance distribution in the axial direction of the heat-shrinkable tube.

The electrical resistance heating element is preferably made of a rigid material having a flexural strength of 10 kg/mm$^2$ or more, a flexural modulus of elasticity of 1 ton/mm$^2$ or more and a linear expansion coefficient of $10^{-6}$/°C. or less. In this case, the electrical resistance heating element may advantageously be made of a composite of carbon fibers arranged or embedded in a matrix of carbon.

The electrical resistance heating element used in the present invention may advantageously be made of a rigid material having not only a high flexural strength and a high flexural modulus of elasticity but also low water absorption and small heating weight loss. In the case of the heating element of such a rigid material, the packaging of the spliced portion of an optical fiber can be carried out substantially without any residual bubbles originating from water absorbed in the heating element. In this sense, it is especially preferable to employ as the electrical resistance heating element a carbon-carbon fiber composite having a flexural strength of 10 kg/mm$^2$ or more, a flexural modulus of elasticity of 1 ton/mm$^2$ or more, an equilibrium water absorption of 1.0% by weight or less in 23° C. 100%RH and a heating weight loss of 0.01%/minute or less as measured in 500° C. air after drying.

In the present invention, it is also preferable to employ as the material of the hot-melt adhesive a resin or a resin composition having a low water absorption.

A resin composition comprising a nylon and an ionomer may advantageously be employed as the material of the hot-melt adhesive having low water absorption and good adhesion to the bare fiber and secondary coating of an optical fiber. The nylon provides excellent adhesion to the secondary coating of the optical fiber due to its complete compatibility with the secondary coating at the time of heat melting, while the ionomer has sufficient compatibility with the nylon and low water absorption. A typical ionomer is an ethylene copolymer with carboxyl groups, part of which are involved in intermolecular-chain crosslinking with metallic ions. Examples of nylons employable in such a resin composition include nylon 6, nylon 66, nylon 11, nylon 12 and copolymers of a monomer mixture thereof. Preferred is nylon 12 having the lowest equilibrium water absorption, which is 1.5% by weight as measured in 23° C. water. Examples of ionomers employable in the resin composition include Sarlin (a tradename of a product manufactured by Du Pont, U.S.A.) and Hi-milan (a tradename of a product manufactured by Mitsui Polychemicals Company, Ltd., Japan), the equilibrium water absorptions of which are in a low range of from 0.1 to 0.3% by weight as measured in 23° C. water. In the case of resin composition of nylon 12 and Sarlin, it is desired to choose such a blending ratio as will provide an equilibrium water absorption of 1% by weight or less in 23° C. water by taking into account the difference in water absorption between the nylon and the ionomer.

In the protective packaging assembly according to the present invention including, between the heat-shrinkable tube and the hot-melt adhesive tube providing a space through which an optical fiber can be passed, the electrical resistance heating element of the kind that is lower in electrical resistance at both end portions thereof than in the central portions thereof, thereby generating a larger amount of heat in the central portion upon passage of an electric current therethrough than in both the end portions, the hot-melt adhesive is preferably made of a material having a melting point higher than the shrinkage temperature of the heat-shrinkable tube and an equilibrium water absorption of 1.0% by weight or less in 23° C. water from the viewpoint of the problem of residual bubbles that may remain in a reinforced unit formed by using the packaging assembly.

Here, it is especially preferable to employ as the heat-shrinkable tube a polyolefin heat-shrinkable tube, and as the hot-melt adhesive polypropylene or a modified product of polypropylene such as maleic anhydride-grafted polypropylene or acrylic acid-grafted polypropylene.

In accordance with another aspect of the present invention, there is provided a protective packaging method of protecting the spliced portion of optical fibers, comprising the steps of (1) providing a protective packaging assembly having a heat-shrinkable tube capable of shrinking in the radial direction thereof, an extended form of hot-melt adhesive disposed on the inner side of the heat-shrinkable tube, and an electrical resistance heating element so disposed on the inner side of the heat-shrinkable tube and extending in the axial direction of the heat-shrinkable tube so as to be capable of heating both the heat-shrinkable tube and the extended form of hot-melt adhesive, and a space provided in the heat-shrinkable tube for allowing the passage of the optical fiber; (2) placing the protective packaging assembly around the splice portion of the optical fibers which has been passed through the space; and (3) supplying an electric current through the electrical resistance heating element to heat-melt the hot-melt adhesive and to heat-shrink the heat-shrinkable tube for forming a reinforced unit including the spliced portion of the optical fiber and the electrical resistance heating element with the hot-melt adhesive acting as a sealant inside the heat-shrunken tube.

BRIEF DESCRIPTION OF THE DRAWINGS

Other objects, features and advantages of this invention will become apparent to those skilled in the art upon reference to the illustrative embodiments about to be described, and the accompanying claims and drawings in which:

FIG. 1 is a cross-sectional view showing an embodiment of the protective packaging assembly of the present invention;

FIG. 2 is a longitudinally sectional view showing the reinforced unit formed by using the protective packaging assembly of FIG. 1 according to the method of the present invention;

FIGS. 4, 6, and 8 are cross-sectional views showing further embodiments of the protective packaging assembly of the present invention;

FIGS. 5, 7, and 9 are longitudinally sectional views showing reinforced units formed by using the protective packaging assemblies of FIGS. 4, 6 and 8, respectively, according to the method of the present invention;

FIG. 13 is a cross-sectional view showing still another embodiment of the protective packaging assembly of the present invention;

FIG. 14 is a longitudinally sectional view showing a reinforced unit formed by using the protective packaging assembly of FIG. 13 according to the method of the present invention;

FIGS. 25A and 25B are respectively cross-sectional and longitudinally sectional views showing still further embodiment of the protective packaging assembly of the present invention together with an optical fiber having a spliced portion about to be packaged; and FIGS. 26A and 26B are respectively cross-sectional and longitudinally sectional views showing a reinforced unit packaged by using the protective packaging assembly shown in FIGS. 25A and 25B.

DETAILED DESCRIPTION OF PREFERRED EMBODIMENTS

Figure 3:
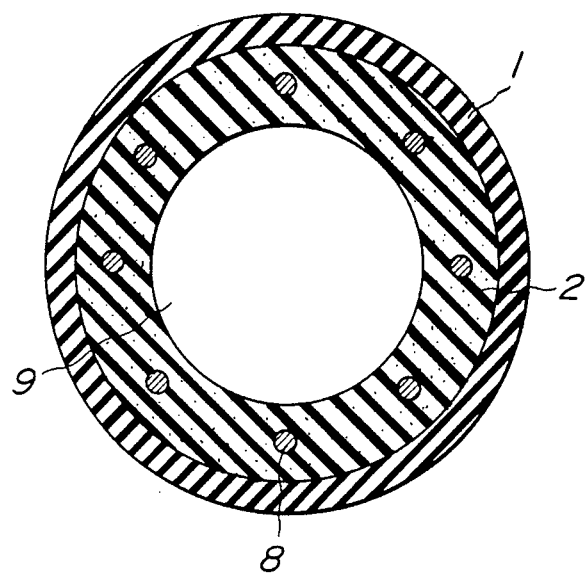
FIG. 3 is a cross-sectional view showing another embodiment of the protective packaging assembly of the present invention.

The following examples, wherein the accompanying drawings are referred to, illustrate the present invention in more detail but should not be construed as limiting the scope of this invention.

EXAMPLE 1

FIG. 1 is a cross-sectional view of a protective packaging assembly according to the present invention which was used in this Example. FIG. 2 is the longitudinally sectional view of a reinforced unit formed by using the protective packaging assembly of FIG. 1 according to the process of the present invention.

The protective packaging assembly consisted of a heat-shrinkable tube 1 capable of shrinking in the radial direction thereof upon heating, a layer 2 of a hot-melt adhesive coated on the inner surface of the heat-shrinkable tube 1, and a rod of an electrical resistance heating element 4 having a layer 3 of a hot-melt adhesive coated therearound and insertedly disposed in a space 5 provided by the cylindrical adhesive layer 2. The electrical resistance heating element 4 was so disposed extendedly in the axial direction of the heat-shrinkable tube 1 as to be capable of heating both the heat-shrinkable tube 1 and the hot-melt adhesive layers 2 and 3. The protective packaging assembly provided the space 5 through which an optical fiber could be passed.

The protective packaging or reinforcement procedures according to the present invention using the above-mentioned protective packaging assembly were as follows. The protective packaging assembly, through the space 5 of which one optical fiber had been passed before fusion splicing of two optical fibers with their end portions stripped of the plastic coatings to expose optical fibers 6, was so placed around the fusion-spliced portion of the optical fiber as to cover parts of plastic coatings 7 adjacent to both the ends of the bare fiber portions 6. When an electric current was passed through the electrical resistance heating element 4, the heat-shrinkable tube 1 was heat-shrunk, and the hot-melt adhesive layers 2 and 3 were molten to be amalgamated with the fusion-spliced portion of the optical fiber. Thus, a reinforced unit as shown in FIG. 2 was formed which included the spliced portion of the optical fiber and the electrical resistance heating element 4 with the hot-melt adhesive acting as something like a sealant inside the heat-shrunken tube 1.

According to the process of the present invention as described above, since the shrinkage of the heat-shrinkable tube in the radial direction thereof, which enables integration of the protective packaging assembly with the spliced portion of the optical fiber, is brought about only by passing an electric current through the electrical resistance heating element to effect internal heating, the reinforcement of the spliced portion of an optical fiber can easily and safely be carried out in a short period of time without using any external heater as used in the conventional techniques. With the use of an electrical resistance heating element 4 having a high modulus of elasticity which can also serve as a reinforcement material, the strength of the reinforced, spliced portion of the optical fiber is greatly improved so that the spliced optical fiber is hardly broken. Due to the low thermal expansion coefficient of the electrical resistance heating element 4, the expansion and contraction due to temperature change of the heat-shrinkable tube 1 and the hot-melt adhesive layer 2 are so minimized that the stress put upon the bare fiber can be so reduced as to hold down the transmission loss of the bare fiber and substantially suppress the breaking of the bare fiber. Furthermore, the hot-melt adhesive layers 2 and 3 fix the reinforced portion of the bare fiber so firmly that the protrusion of the bare fiber and the building up of torsional stress on the bare fiber can be prevented, also contributing to the prevention of breaking of the bare fiber.

EXAMPLE 2

FIG. 3 is a cross-sectional view of a protective packaging assembly according to the present invention which was used in this Example. The protective packaging assembly consisted of a heat-shrinkable tube 1, a layer 2 of a hot-melt adhesive coated on the inner surface of the tube 1, and a plurality of wires of an electrical resistance heating element 8 disposed extendedly in the longitudinal direction of the tube and embedded at a given interval in the cylindrical layer 2 of the hot-melt adhesive. Thus disposed, the electrical resistance heating element 8 was capable of heating both the heat-shrinkable tube 1 and the hot-melt adhesive layer 2, which provided a space 9 through which an optical fiber could be passed.

The protective packaging of the fusion-spliced portion of the optical fiber was carried out by using the above-mentioned protective packaging assembly in substantially the same manner as in Example 1.

Just as demonstrated in Example 1, it is also apparent from this example that, according to the present invention, the protective packaging can be easily and safely carried out in a short period of time without using any external heater. According to the present invention, with the use of an electrical resistance heating element having a high modulus of elasticity and a low thermal expansion coefficient and the use of the hot-melt adhesive having a high modulus of elasticity and a good adhesion to the bare fiber and to the plastic coating thereon as well as to the electrical resistance heating element, a highly reliable reinforced unit can be formed which advantageously gives rise to little breaking of the bare fiber and to little increase in transmission loss of the optical fiber.

EXAMPLE 3

Figure 4:
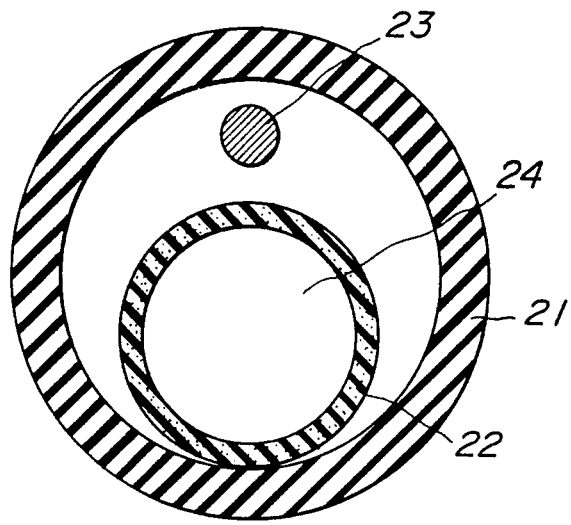
Figure 5:
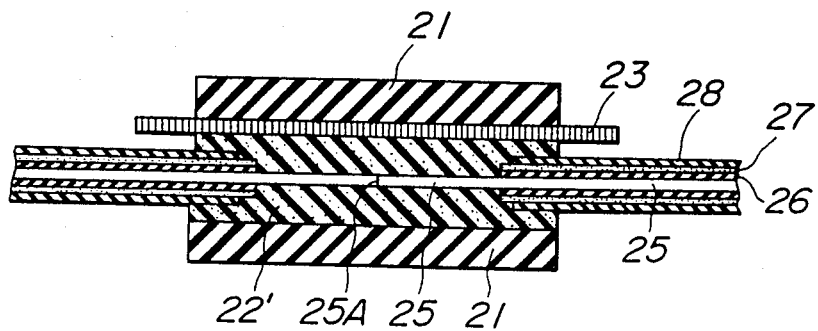

FIG. 4 is a cross-sectional view of a protective packaging assembly according to the present invention which was used in this example. FIG. 5 is the longitudinally sectional view of a reinforced unit formed by using the protective packaging assembly of FIG. 4 according to the process of the present invention.

The protective packaging assembly consisted of a heat-shrinkable tube 21 capable of shrinking in the radial direction thereof upon heating, a tube 22 of a hot-melt adhesive disposed on the inner side of the heat-shrinkable tube 21, and a rod of an electrical resistance heating element 23 disposed annexedly between the tubes 21 and 22 and extendedly in the axial direction of the tubes 21 and 22. Thus disposed, the electrical resistance heating element 23 was capable of heating both the heat-shrinkable tube 21 and the hot-melt adhesive tube 22, which had a space 24 through which an optical fiber could be passed.

The heat-shrinkable tube 21 was made of polyethylene, and had a length of 6 cm, an inner diameter of 2.5 mm and a radial thickness of 0.2 mm. The heat shrinkage of the tube 21 was 50%. The hot-melt adhesive tube 22 was made of an acrylic acid grafted product of ethylene-ethyl acrylate copolymer (acrylic acid content: 0.3%), and had a length of 6 cm, an outer diameter of 1.6 mm and a thickness of 0.2 mm. The electrical resistance heating element 23 was a nichrome wire having a diameter of 0.07 mm and a length of 10 cm.

The procedures of the protective packaging process of this invention using the above-mentioned protective packaging assembly will be described with reference to FIG. 5.

One optical fiber having a diameter of approximately 0.9 mm was passed through the space 24 of the protective packaging assembly of FIG. 4 and moved away from the fusion area. The optical fiber and another optical fiber with their end portions stripped of the plastic coatings 26, 27 and 28 to expose their bare fibers 25 having a diameter of 125 μm was fusion-spliced in an end-to-end position. The protective packaging assembly, through the space 24 of which the optical fiber had been passed before the fusion splicing as described above, was so placed around the fusion-spliced portion 25A of the optical fiber as to cover parts of the plastic coatings 26, 27 and 28 adjacent to both the ends of the bare fiber core portion, the plastic coatings being made of a silicone primary coating 26, a silicone buffer coating 27 and a nylon secondary coating 28. When a DC voltage of 10 volts was applied across the electrical resistance heating element 23, the heat-shrinkable tube 21 was heat-shrunken in the radial direction thereof while the hot-melt adhesive tube 22 was molten to form an adhesive layer 22'. Thus, a packaged or reinforced unit as shown in FIG. 5 was formed in a short period of 1 to 3 minutes which included the spliced portion of the optical fiber and the electrical resistance heating element 23 with the hot-melt adhesive 22' acting as something like a sealant inside the heat-shrunken tube 21.

The spliced portion of the optical fiber thus packaged according to the present invention (reinforced unit) had excellent properties as mentioned below.

(1) Due to the high tensile strength of the electrical resistance heating element disposed extendedly in the longitudinal direction in the protective packaging assembly, the tensile strength of the spliced portion was as high as 2 kg.

(2) The transmission loss of the optical fiber caused by this protective packaging was less than 0.01 dB per spliced portion.

(3) Due to the small expansion and contraction upon temperature change of the electrical resistance heating element 23 disposed extendedly in the longitudinal direction in the protective packaging assembly, the temperature dependence of transmission loss of the optical fiber spliced portion thus packaged or reinforced was less than 0.03 dB per spliced portion within the range of −20° to +60° C.

(4) Protrusion of the optical fiber core 25 liable to occur upon temperature change was substantially prevented. Even after 30 cycles in a heat cycle test (−20° C. to +60° C., 6 hours per cycle), there was little breaking of the optical fiber, the transmission loss change of which was less than 0.04 dB per spliced portion.

(5) Not only after a 30 days' shelf test at a high temperature of 80° C. but also after a 30 days' shelf test at a high temperature of 85° C. and at a high relative humidity of 85%, the transmission loss change of the optical fiber was less than 0.04 dB per spliced portion.

(6) Due to the complete intergration of the spliced portion of the optical fiber with the hot-melt adhesive, the propagation of twisting and bending movements of the optical fiber by external forces was substantially prevented, and also contributing to minimal breaking of the optical fiber.

As regards this Example as well as the following Examples 4 to 9, the materials of the protective packaging assembly used therein and the properties of the protective packaged unit formed therein are listed in Table 1 which will be given later.

EXAMPLE 4

FIG. 6 is the cross-sectional view of a protective packaging assembly according to the present invention which was used in this Example. The only difference between the protective packaging assembly of FIG. 4 and the protective packaging assembly of FIG. 6 was that the latter had a plurality (four in FIG. 6, however, not necessarily four) of wires of the electrical resistance heating element. FIG. 7 is the longitudinally sectional view of a packaged unit formed by using the protective packaging assembly of FIG. 6 according to the process of the present invention. The spliced portion of the optical fiber reinforced in this Example in the same manner as in Example 5 (packaged unit) had excellent properties as shown in Table 1.

EXAMPLE 5

A protective packaging assembly having the same structure as that of the protective packaging assembly used in Example 3 but using different materials from those of Example 3 was used in this Example. 10 cm in length of Besfight HM-6000 (tradename of a carbon fiber yarn of 6,000 filaments manufactured by Toho Rayon Company, Ltd., Japan) was used instead of nichrome wire as the electrical resistance heating element 23. An ethylene-propylene copolymer was used instead of the polyethylene as the material of the heat-shrinkable tube 21. Nylon 12 was used instead of the acrylic acid-grafted product of ethylene-ethyl acrylate copolymer as the material of the hot-melt adhesive tube 22.

Substantially the same procedures as in Example 3 were repeated to reinforce the spliced portion of an optical fiber. The reinforced unit thus formed had excellent properties as shown in Table 1.

EXAMPLE 6

Figure 8:
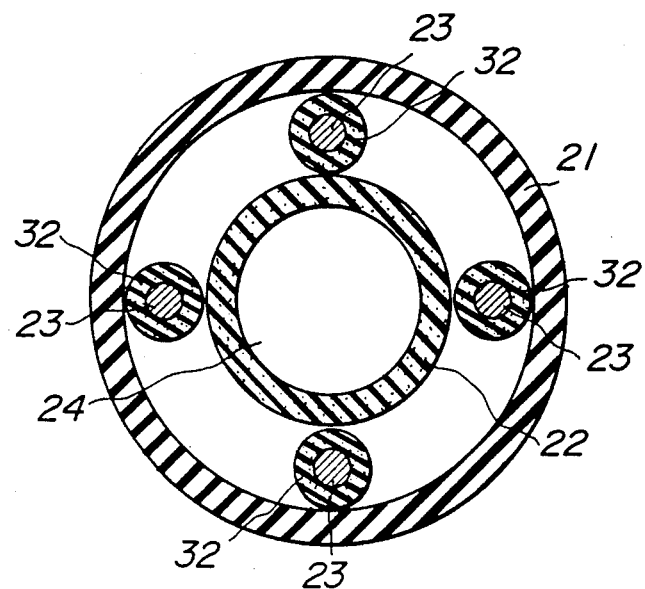
Figure 9:
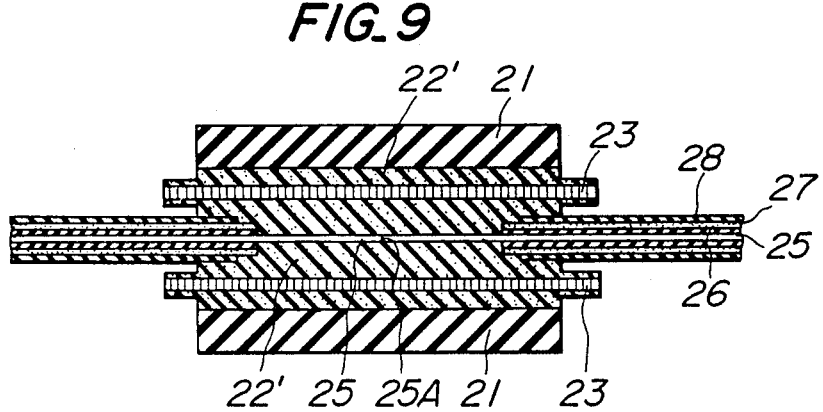

FIG. 8 is a cross-sectional view of a protective packaging assembly according to the present invention which was used in this Example. FIG. 9 is the longitudinally sectional view of a reinforced unit formed by using the protective packaging assembly of FIG. 8 according to the process of the present invention.

The protective packaging assembly of FIG. 8 was substantially the same in structure as the protective packaging assembly of FIG. 6 except that wires of the electrical resistance heating element 23 disposed between the tubes 21 and 22 had layers 32 of a hot-melt adhesive coated thereon. The heat-shrinkable tube 21 was made of polyethylene, and had a length of 6 cm, an inner diameter of 2.5 mm and a thickness of 0.2 mm. The heat shrinkage of the tube 21 was 50%. The tube 22 and layers 32 of the hot-melt adhesive were made of nylon 12 (dried). The tube 22 had a length of 6 cm, an outer diameter of 1.6 mm and a thickness of 0.2 mm. The layers 32 had a thickness of about 0.2 mm. 10 cm in length of Besfight HM-6000 (tradename of a carbon fiber yarn of 6,000 filaments manufactured by Toho Rayon Company, Ltd., Japan) was used as the electrical resisitance heating element 23, and was coated with the above-mentioned hot-melt adhesive by means of a wire coating apparatus.

Substantially the same procedures as in Example 3 except that a DC voltage of 4 volts was applied across both the ends of the electrical resisitance heating element 23 were repeated to reinforce the spliced portion of an optical fiber. A reinforced unit as shown in FIG. 9 was formed in a short period of 30 to 60 seconds.

The spliced portion of the optical fiber thus packaged (reinforced unit) had excellent properties as shown in Table 1. In the tensile test, breaking occurred in a portion other than the reinforced, spliced portion of the optical fiber. Even after the heat cycle test, there was no breaking of the optical fiber.

forced unit) had excellent properties as shown in Table 1.

TABLE 1

| Example No. | Heat-Shrinkable Tube | Hot-Melt Adhesive | Electrical Resistance Heating Element | Structure of Assembly | Tensile Strength | Properties (per spliced portion) Transmission Loss Change ||||
|---|---|---|---|---|---|---|---|---|---|---|
| | | | | | | Reinforcement | Temperature Dependency 3 | Heat Cycle test 4 | High Temp. Shelf test 5 | High Temp. and High Humidity 6 Shelf test |
| 3 | polyethylene | acrylic acid-grafted product of ethylene-ethyl acrylate copolymer | nichrome wire 1 | FIG. 4 | 2 Kg | less than 0.01 dB | less than 0.03 dB | less than 0.04 dB | less than 0.04 dB | less than 0.04 dB |
| 4 | polyethylene | acrylic acid-grafted product of ethylene-ethyl acrylate copolymer | " | FIG. 6 | 2.5 Kg | less than 0.01 dB | less than 0.03 dB | less than 0.04 dB | less than 0.04 dB | less than 0.04 dB |
| 5 | ethylene-propylene copolymer | nylon 12 | carbon fiber 2 | FIG. 4 | 3.5 Kg | less than 0.01 dB | less than 0.03 dB | less than 0.04 dB | less than 0.04 dB | less than 0.04 dB |
| 6 | polyethylene | " | " | FIG. 8 | 3.0 Kg | less than 0.01 dB | less than 0.03 dB | less than 0.04 dB | less than 0.04 dB | less than 0.04 dB |
| 7 | polyethylene | " | " | — | 4.0 Kg | less than 0.01 dB | less than 0.03 dB | less than 0.04 dB | less than 0.04 dB | less than 0.04 dB |
| 8 | polyethylene | nylon 6-nylon 12 copolymer | " | FIG. 8 | 3.5 Kg | less than 0.01 dB | less than 0.03 dB | less than 0.04 dB | less than 0.04 dB | less than 0.04 dB |
| 9 | polyethylene | ethylene-vinyl acetate copolymer | " | FIG. 8 | 2.5 Kg | less than 0.01 dB | less than 0.03 dB | less than 0.04 dB | less than 0.04 dB | less than 0.04dB |

Note
1 diameter: 0.07 mm
2 Besfight HM-6000 (tradename of a carbon fiber yarn of 6,000 filaments manufactured by Toho Rayon Company, Ltd., Japan)
3 from −20° C. to +60° C.
4 from −20° C. to +60° C. 6 hours per cycle, after 30cycles
5 80° C., after 30 days
6 85° C., 85% RH, after 30 days

EXAMPLE 7

A protective packaging assembly different from the protective packaging assembly of FIG. 8 only in that wires (carbon fiber yarn) of the electrical resistance heating element were arranged along the cylindrical inner surface of the hot-melt adhesive tube instead of being disposed between the heat-shrinkable tube and the hot-melt adhesive tube was used in this Example.

Substantially the same procedures as in Example 6 were repeated to reinforce the spliced portion of an optical fiber. The reinforced unit thus formed had excellent properties as shown in Table 1.

EXAMPLE 8

A protective packaging assembly different from the protective packaging assembly of FIG. 8 as used in Example 6 only in that a nylon 6-nylon 12 copolymer (dried) was used instead of the nylon 12 as the material of the hot-melt adhesive.

The spliced portion of an optical fiber packaged in this Example in the same manner as in Example 6 (reinforced unit) had excellent properties as shown in Table 1.

EXAMPLE 9

A protective packaging assembly different from the pretective packaging assembly of FIG. 8 as used in Example 6 only in that an ethylene-vinyl acetate copolymer was used instead of nylon 12 as the material of the hot-melt adhesive.

The spliced portion of an optical fiber packaged in this Example in the same manner as in Example 6 (rein-forced unit) had excellent properties as shown in Table 1.

Just as demonstrated in Example 1, it is also apparent from Examples 3 to 9 that, according to the present invention, the protective packaging can be easily and safely carried out in a short period of time without using any external heater. According to the present invention, with the use of an electrical resistance heating element having a high Young's modulus and a low linear expansion coefficient, a highly reliable reinforced unit can be formed which advantageously gives rise to little breaking of the optical fiber core and to a decreased change in transmission loss of the optical fiber.

However, in the foregoing Examples, there is a fear of bubbles remaining inside the heat-shrinkable tube after the integration by heat, which fear leads to some likelihood of optical fiber breaking because a slight possibility of optical fiber core protrusion in the bubbled area upon temperature change still remains.

Figure 10A:
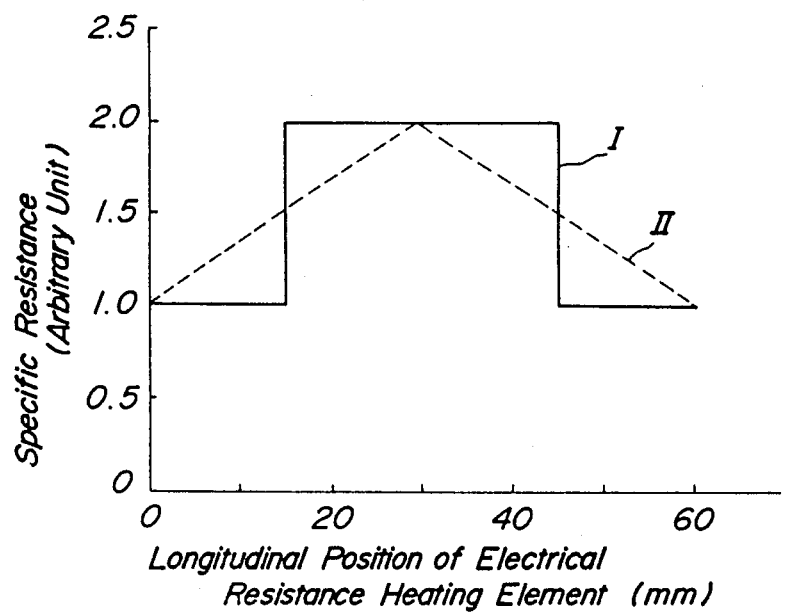
FIG. 10A is a characteristic chart of resistance distributions I and II with an ordinate representing the specific resistance of an electrical resistance heating element disposed on the inner side of a heat-shrinkable tube and extending in the longitudinal direction of the tube and with an abscissa representing the longitudinal position of the electrical resistance heating element.

In view of the above, an electrical resistance heating element having a characteristic resistance distribution I or II as shown in FIG. 10A may preferably be employed in the present invention. More specifically, such an electrical resistance heating element has a higher resistance in the central portion thereof and a lower resistance in both the end portions thereof corresponding to the end portions of the heat-shrinkable tube. When an electric current is passed through the electrical resistance heating element, temperature rises rapidly in the central portion of the heating element to rapidly heat the central portions of the heat-shrinkable tube and the hot-melt adhesive tube, and slowly in the end portions of the heating element to slowly heat the end portions of the tubes, whereby the heat shrinkage of the heat-shrinkable tube and the melting of the hot-melt adhesive tube develop from their central portions to their end portions thereby to easily enable bubbles formed upon melting of the hot-melt adhesive to be squeezed out or removed from the reinforced unit by the shrinkage pressure developing from the center toward the ends.

Figure 10B:
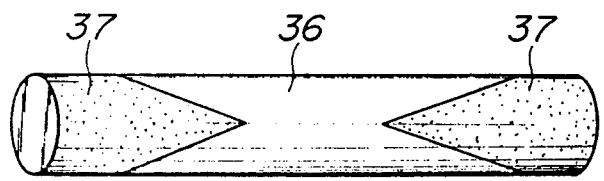
FIG. 10B is a perspective view showing an electrical resistance heating element with a coating of a conductive paste or a vacuum-deposited film of a metal which provides a resistance distribution characteristic similar to the distribution II as shown in FIG. 10A.

Such characteristic resistance distributions in the axial direction as is shown in FIG. 10A can be provided, for example, by coating only or preferentially the end portions of a base electrical resistance heating element with a conductive paste with a lower resistivity than that of the heating elements, such as a silver paste, an aluminum paste, a copper paste or a nickel paste, or by vacuum depositing a metal such as gold or aluminum only or preferentially on the end portions of a base heating element. The characteristic resistance distribution I as shown by the solid line in FIG. 10A can be formed, for example, by effecting the conductive paste coating or the metal vacuum deposition only on the end portions (for example, over the 15 cm-long area adjacent to the ends) of the base heating element with the central portion remaining intact. The characteristic resistance distribution II as shown by the broken line in FIG. 10A can be formed, for example, by effecting the conductive paste coating with a continuous decrease in coating thickness from the ends to the center. Characteristic resistance distributions similar to the characteristic resistance distribution II can be formed by effecting the conductive paste coating with a plurality of conductive pastes differing in their conductive material content, and applying the paste with the amount of conductive material content being decreased from the end portions to the central portions. Also, the conductive paste coating or the metal vacuum deposition can be applied in such a way that they form an electrical resistance heating element as shown in FIG. 10B which consists of a base heating element 36 and a conductive part provided thereon.

Figure 11:
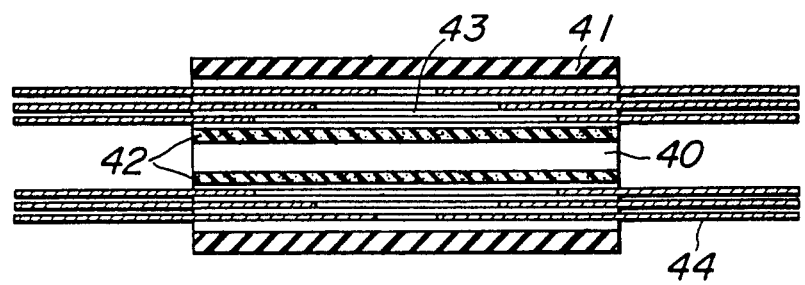
FIG. 11 is a longitudinally sectional view showing a still further embodiment of the protective packaging assembly of the present invention.

FIG. 11 shows the longitudinal section of a protective packaging assembly including an electrical resistance heating element with a characteristic resistance distribution similar to the distribution II as shown in FIG. 10A. More specifically, the protective packaging assembly comprises a heat-shrinkable tube 41 capable of shrinking in the radial direction thereof upon heating, a tube 42 of a hot-melt adhesive disposed on the inner side of the tube 41, and a plurality of rods of an electrical resistance heating element 43 disposed between the tubes 41 and 42 and extendedly in the axial direction of the tubes and arranged along the cylindrical inner surface of the heat-shrinkable tube. The rods 43 have different areas where conductive paste 44 are coated with distributions as shown in FIG. 11. The rods of the electrical resistance heating element 43 may be impregnated or coated with the hot-melt adhesive. An optical fiber can be passed through the space 40 provided on the inner side of the tube 42.

Figure 12:
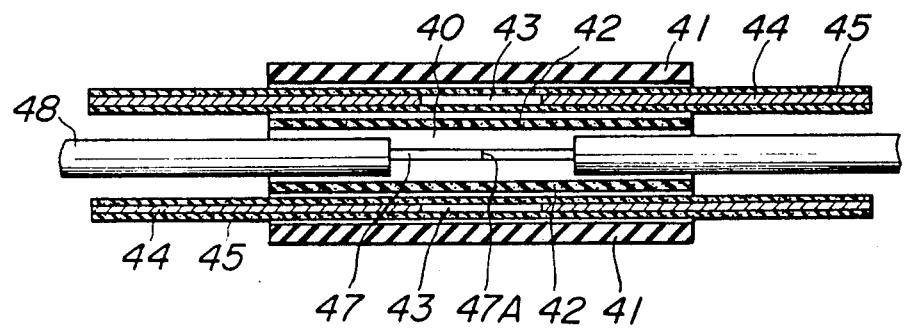
FIG. 12 is a longitudinally sectional view showing another embodiment of the protective packaging assembly of the present invention together with an optical fiber having a spliced portion to be packaged.

FIG. 12 shows the longitudinal section of a protective packaging assembly including an electrical resistance heating element with a characteristic resistance distribution substantially identical with the distribution I as shown in FIG. 10A. The electrical resistance heating element 43 consists of a plurality of rods coated with a conductive paste 44 as is shown in FIG. 12. The rods of the heating element have hot-melt adhesive layers 45 coated on the cylindrical outer surface thereof. The rods of the heating element is disposed between the tubes 41 and 42 such as described with reference to FIG. 11 and extendedly in the axial direction of the tubes.

The protective packaging procedures according to this invention using a protective packaging assembly of the kind as mentioned above will be explained with reference to FIG. 12 as follows.

One optical fiber is passed through the space 40 of the protective packaging assembly and moved away from the fusion area. The optical fiber and another optical fiber with their end portions stripped off the plastic coatings 48 to expose their fiber cores 47 are fusion-spliced. The protective packaging assembly, through the space 40 of which the optical fiber has been passed before the fusion-splicing as described above, is so placed around the fusion-spliced portion 47A of the optical fiber as to cover the bare fiber core 47 and parts of the plastic coatings 48 adjacent to both the ends of the bare fiber core portion.

Both of the ends of the electrical resistance heating element 43 are electrically connected to a constant voltage source such as a storage battery or a dry cell, which is not shown in FIG. 12. Upon passage of electricity, the electrical resistance heating element 43 generates heat, which raises the temperature of the heat-shrinkable tube 41 as well as the hot-melt adhesive layers 45 and tube 42 rapidly in their central portions and slowly in their end portions. Thus, the heat shrinkage of the heat-shrinkable tube 41 in the radial direction develops from the central portion to the ends portions of the tube 41 while at the same time the melting of the hot-melt adhesive layers 45 and tube 42 develops from the central portion to the end portions to form an adhesive layer which completely surroundingly adheres to and fixes the bare fiber 47. Thus, a reinforced unit is formed which includes the spliced portion of the optical fiber and the electrical resistance heating element with the hot-melt adhesive acting as something like a sealant inside the heat-shrunk tube. The development of heat shrinkage of the heat-shrinkable tube 41 from the center to the ends enables the residual bubbles formed between the bare optical fiber 47, the hot-melt adhesive tube 42, the electrical resistance heating element 43 and the heat-shrinkable tube 41 to be substantially completely removed from the reinforced unit.

If a flexible electrical resistance heating element is used in a protective packaging assembly of the kind as described above, relatively large shrinkage and bending of a heat-shrunken tube and a hot-melt adhesive layer as the reinforcing materials occur during the course of cooling of the resulting reinforced unit and even when allowed to stand at low temperatures below 23° C. The occurrence of such shrinkage and bending may sometimes result in optical fiber microbending leading to increased transmission loss of an optical fiber and/or to breaking of the fiber. If a resin other than nylons is used as the material of the hot-melt adhesive, sufficient adhesion to the secondary nylon plastic layer of the optical fiber may not be obtained, thus leading to more likelihood of an optical fiber breaking when tensile stress is put on the reinforced unit. When a resin of the nylon type is used, sufficient adhesion to the secondary nylon layer of the optical fiber may be obtained, but there arises a possibility of bubbles forming in the resin from moisture contained in the nylon resin having a high moisture absorption during the course of resistance heating. Such a possibility may lead to a fear of optical fiber transmission loss change and protrusion breaking due to temperature change.

In view of the above, a rigid resistance material having a high flexural strength, a high flexural modulus of elasticity and low linear expansion coefficient, and a nylon-ionomer resin composition having a low water absorption under saturation may advantageously be used as the electrical resistance heating element, and as the hot-melt adhesive, respectively, of the protective packaging assembly, whereby optical fiber microbending during cooling and under low temperatures can be substantially prevented, and optical fiber transmission loss variation and protrusion breaking due to temperature change can be well suppressed.

EXAMPLE 10

FIG. 13 is the cross-sectional view of a protective packaging assembly according to the present invention which was used in this Example. FIG. 14 is the longitudinally sectional view of a reinforced unit formed by using the packaging assembly of FIG. 13 according to the process of the present invention.

The protective packaging assembly consisted of a heat-shrinkable tube 51 capable of shrinking in the radial direction thereof upon heating, a tube 52 of a hot-melt adhesive disposed on the inner side of the tube 51, and a rod of an electrical resistance heating element 53 disposed annexedly between the tubes 51 and 52 and extendedly in the axial direction of the tubes. Thus disposed, the electrical resistance heating element 53 was capable of heating both the heat-shrinkable tube 51 and the hot-melt adhesive tube 52, which had a space 54 through which an optical fiber could be passed.

The heat-shrinkable tube 51 was a polyethylene tube having a length of 50 mm, an inner diameter of 3.2 mm, a radial thickness of 0.25 mm and a heat shrinkage of 50%. The hot-melt adhesive tube 52 was made of a resin composition composed of 15% by weight of Daicel L1640(trademark of nylon 12 manufactured by Daicel Ltd., Japan) and 85% by weight of Hi-milan 1652(tradename of an ionomer manufactured by Mitsui Polychemicals Company, Ltd., Japan), and had a length of 50 mm, an outer diameter of 1.9 mm and a thickness of 0.2 mm. The electrical resistance heating element 53 was made up of a carbon-carbon fiber composite with a linear expansion coefficient of substantially zero which comprised 24,000 filaments of carbon fiber embedded in a matrix of carbon, and layer 53' of a conductive Ag paste coated on both of the 10 mm-long end portions of the composite, wherein the electrical resistance of the heating element 53 was so lowered as to hold down heat generation in the 10 mm-long end portions upon passage of electricity for enabling the heat shrinkage of the heat-shrinkable tube to develop from the center to the ends to facilitate the removal of bubbles. The carbon-carbon fiber composite had a length of 60 mm and a diameter of 1.8 mm. Here, the carbon-carbon fiber composite was one prepared by impregnating a bundle of yarns made of carbon fiber filaments with a resin such as a furfuryl alcohol resin or a phenol resin and heating the bundle in an inert atmosphere such as argon gas at 800° to 1,000° C. to carbonize the resin, the impregnation and carbonization being repeated.

The packaging procedures according to this invention using the above-mentioned protective packaging assembly will be described with reference to FIG. 14.

One optical fiber was passed through the space 54 of the protective packaging assembly of FIG. 13 and moved away from the fusion area. The optical fiber and another optical fiber with their end portions stripped off the plastic coating 56, 57 and 58 to expose their fiber cores 11 was fusion-spliced in an end-to-end position. The packaging assembly, through the space 54 of which the optical fiber had been passed before the fusion splicing as described above, was so placed around the fusion-spliced portion 55A of the optical fiber as to cover the bare fiber 55 and parts of the plastic coatings 56, 57 and 58 adjacent to both the ends of the bare fiber core portion, the plastic coatings being made up of a silicone primary coating 56, a silicone buffer coating 57 and a nylon secondary coating 58. Both the ends of the electrical resistance heating element 53 were pressed between the two electrodes of an electrode system of a DC constant current source to be electrically connected to the electrode system. When a DC current of 4.5 A was passed through the heating element, the heat-shrinkable tube 51 was heat-shrunk in the radial direction thereof while the hot-melt adhesive tube 52 was molten to form an adhesive layer 52'. Thus, a reinforced unit as shown in FIG. 14 was formed in a short period of 10 to 30 seconds which included the spliced portion 55A of the optical fiber and the electrical resistance heating element 53 with the hot-melt adhesive layer 52' acting as something like a sealant inside the heat-shrunk tube 51.

The spliced portion of the optical fiber thus reinforced according to the present invention (reinforced unit) had excellent properties as mentioned below.

(1) Due to the use of the electrical resistance heating element 53 having a high tensile strength and a high Young's modulus and the use of the hot-melt adhesive 52' having a sufficient adhesion to the secondary nylon layer 58 of the optical fiber, the tensile strength of the reinforced, spliced portion of the optical fiber was as high as 2.5 kg to 3.5 kg.

(2) Due to the high flexural strength and high flexural modulus of elasticity of the electrical resistance heating element, bending and breaking of the spliced portion were substantially prevented, and the transmission loss of the optical fiber attributed to the packaging was less than 0.01 dB per spliced portion.

Additionally stated, if a heating element of 1 to 2 mm in diameter having a flexural strength of less than 10 kg/mm$^2$ is used, there is a likelyhood of element breaking during handling of the element. Therefore, it is preferable to use a heating element having a flexural strength of at least 10 kg/mm$^2$. Further additionally stated, when the flexural modulus of elasticity of a heating element is less than 1 ton/mm$^2$, the spliced portion is bent upon the shrinkage of the plastic reinforcement materials, i.e. the heat-shrinkable tube and the hot-melt adhesive, during cooling thereof, leading to an increase in transmission loss of the optical fiber. Therefore, it is preferable to use a heating element having a flexural modulus of elasticity of at least 1 ton/mm$^2$.

(3) Due to the smaller expansion and shrinkage upon temperature change of the electrical resistance heating element 53 than those of optical fiber which is the bare fiber, the temperature dependency of transmission loss of the optical fiber spliced portion reinforced was less than 0.02 dB per spliced portion within the range of $-40°$ to $+70°$ C.

(4) Protrusion of the optical fiber core 55 liable to occur upon temperature change was substantially prevented. Even after 30 cycles in a heat cycle test ($-20°$ C. to $+60°$ C., 6 hours per cycle), there was little breaking of the optical fiber, the transmission loss change of which was less than 0.02 dB per spliced portion.

(5) Not only after a 30 days+ shelf test at a high temperature of 80° C. but also after a 30 days' shelf test at a high temperature of 60° C. and at a high relative humidity of 95%, the transmission loss change of the optical fiber was less than 0.02 dB per spliced portion.

(6) Due to the complete integration of the spliced portion of the optical fiber with the hot-melt adhesive, the propagation of twisting and bending of the optical fiber by external force was substantially prevented, also contributing to little breaking of the optical fiber.

EXAMPLE 11

A protective packaging assembly different from the assembly of FIG. 13 as used in Example 10 only in the kind of electrical resistance heating element was used in this example. Instead of the rod of the carbon-carbon fiber composite, a rod of a sintered carbon material (graphite heating element with a flexural strength of 18 kg/mm$^2$ manufactured by Toyo Carbon K.K., Japan) was used as the electrical resistance heating element 53. The sintered carbon material rod had a length of 60 mm and a diameter of 1.5 mm, and layers of a conductive Ag paste coated on both of the 10 mm-long end portions of the rod just like in Example 10.

Substantially the same procedures as in Example 10 except that the time of formation of a reinforced unit was 10 to 30 seconds were repeated to reinforce the fiber. The reinforced unit thus formed had substantially the same excellent properties except for data of tensile strength of the reinforced, spliced portion of the optical fiber and temperature dependency of transmission loss of the reinforced, spliced portion of the optical fiber.

As regards this Example as well as the following Examples 12 to 18, the materials of the protective packaging assembly used therein and the properties of the reinforced unit formed therein are listed in Table 2 which will be given later.

EXAMPLES 12 AND 13

Figure 15:
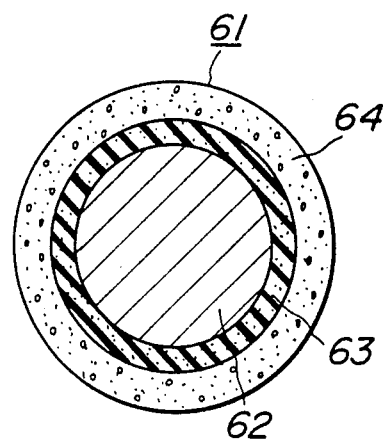
FIGS. 15, 16 and 17 are cross-sectional views showing electrical resistance heating elements, each employed in Examples 12, 13 and 15 respectively, which will be described later.
Figure 16:
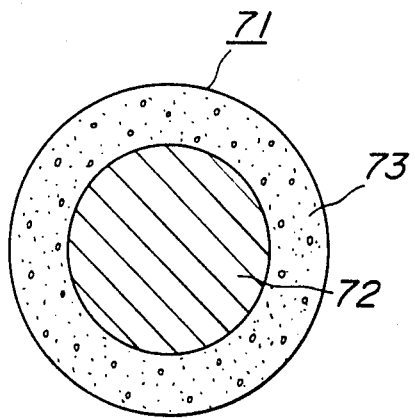

Protecting packaging assemblies different from the assembly of FIG. 13 as used in Example 10 only in the kind of electrical resistance heating element were used in these Examples. FIGS. 15 and 16 are the cross-sectional views of the structures of base electrical resistance heating elements used in Examples 12 and 13, respectively. The base electrical resistance heating element 61 shown in FIG. 15 was prepared by coating an acrylic acid-grafted product of ethylene-ethyl acrylate copolymer around an SUS steel rod 62 having a diameter of 1 mm and a length of 60 mm to form an insulating layer 63 and fixing longitudinally 18,000 filaments of carbon fiber 64 impregnated with the above-mentioned grafted product around the insulating layer 65. The base electrical resistance heating element 71 shown in FIG. 16 was prepared by fixing longitudinal 18,000 filaments of carbon fiber impregnated with the above-mentioned grafted product around a reinforced quartz glass rod 72 reinforced by an HF treatment and a silane coupling agent treatment and having a diameter of 1 mm and a length of 60 mm. Thus, the base electrical resistance heating elements 61 and 71 used in Examples 12 and 13, respectively, each had a structure having an electrical resistance material fixed around a rigid insulating material. Layers of a conductive Ag paste were formed on each of the base heating elements 61 and 71 in the same manner as described in Example 10 to provide the desired electrical resistance heating elements.

The spliced portions of optical fibers packaged in these Examples in the same manner as in Example 11 (reinforced units) had excellent properties as shown in Table 2.

EXAMPLE 14

A protective packaging assembly different from the packaging assembly of FIG. 13 as used in Example 10 only in that a rod (length: 60 cm, diameter: 2.0 mm) of BN composite EC(tradename of a conductive ceramic material manufactured by Denki Kagaku Kogyo K.K., Japan) was used as the base electrical resistance heating element instead of the carbon-carbon fiber composite rod.

The spliced portion of an optical fiber packaged in this Example in the same manner as in Example 11 (reinforced unit) had excellent properties as shown in Table 2.

EXAMPLE 15

Figure 17:
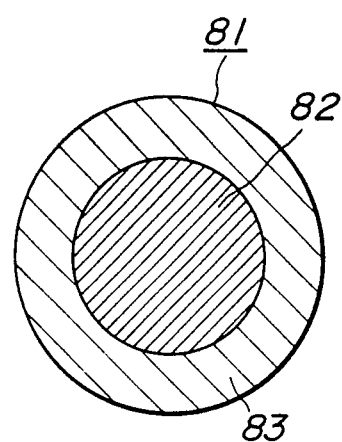
Figure 18:
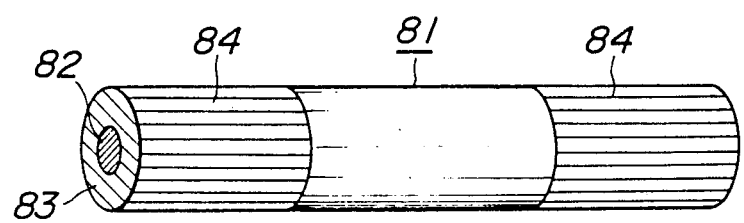
FIG. 18 is a perspective view showing the electrical resistance heating element employed in Example 15.

A protective packaging assembly different from the packaging assembly of FIG. 13 as used in Example 10 only in the kind of electrical resistance heating element was used in this Example. FIGS. 17 and 18 are the cross-sectional and perspective views, respectively, of an electrical resistance heating element 81 used in this Example. More specifically, the heating element 81 was prepared by winding a carbon fiber prepreg 83 around a core material 82 made up of a bundle of three carbon fiber yarns of 6,000 filaments, followed by heat curing and subsequent Ag paste coating effected in both the end portions 84 in substantially the same manner as described in Example 10. The heating element 81 had a length of 60 mm and a diameter of 2.0 mm. Additionally stated, the carbon fiber prepreg 83 was a film of carbon fibers arranged all in one direction and impregnated with a thermosetting resin to be cured.

The spliced portion of an optical fiber packaged in this Example in the same manner as in Example 11 (reinforced unit) had excellent properties as shown in Table 2.

EXAMPLE 16

A protective packaging assembly different from the packaging assembly of FIG. 13 as used in Example 10 only in that a rod (length: 60 mm, diameter: 1.0 mm) of a composite of carbon fiber yarn (12,000 filaments) embedded all in one direction in a matrix of a thermoset polyimide resin was used as the base electrical resistance heating element instead of the carbon-carbon fiber composite rod.

The spliced portion of an optical fiber packaged in this Example in the same manner as in Example 11 (reinforced unit) had excellent properties as shown in Table 2.

EXAMPLE 17

A protective packaging assembly different from the packaging assembly of FIG. 13 as used in Example 10 only in that a rod (length: 60 mm, diameter: 1.0 mm) of carbon fiber yarn (12,000 filaments) impregnated with a silane coupling agent A-172 (tradename of a product manufactured by Nippon Unicar, Ltd., Japan) and heat-molded was used as the base electrical resistance heating element instead of the carbon-carbon fiber composite rod.

The spliced portion of an optical fiber packaged in this Example in the same manner as in Example 11

(reinforced unit) had excellent properties as shown in Table 2.

the optical fiber and to a decreased change in transmission loss of the optical fiber.

TABLE 2

| Example No. | Heat-Shrinkable Tube | Hot-Melt Adhesive | Electrical Resistance Heating Element | Structure of Assembly | tensile Strength | Properties (per spliced portion) | | | | |
|---|---|---|---|---|---|---|---|---|---|---|
| | | | | | | Re-inforcement | Transmission Loss Change | | | |
| | | | | | | | Temperature Dependency 2 | Heat Cycle Test 3 | High Temp. Shelf Test 4 | High Temp. and High Humidity Shelf Test 5 |
| 11 | polyethylene | mixture of nylon 12(15 wt. %) and ionomer(85 wt. %) | sintered carbon material | — | 2.0-2.5 Kg | less than 0,01 dB | less than 0,04 dB | less than 0,02 dB | less than 0,02 dB | less than 0,02 dB |
| 12 | polyethylene | mixture of nylon 12(15 wt. %) and ionomer(85 wt. %) | SUS/grafted product 1)/carbon fiber | FIG. 15 | 2.0-3.0 Kg | less than 0,01 dB | less than 0,04 dB | less than 0,02 dB | less than 0,02 dB | less than 0,02 dB |
| 13 | polyethylene | mixture of nylon 12(15 wt. %) and ionomer(85 wt. %) | reinforced quartz glass/grafted product/carbon fiber | FIG. 16 | 2.0-3.0 Kg | less than 0,01 dB | less than 0,04 dB | less than 0,02 dB | less than 0,02 dB | less than 0,02 dB |
| 14 | polyethylene | mixture of nylon 12(15 wt. %) and ionomer(85 wt. %) | conductive ceramic material | — | 2.0-3.0 Kg | less than 0,01 dB | less than 0,04 dB | less than 0,02 dB | less than 0,02dB | less than 0,02 dB |
| 15 | polyethylene | mixture of nylon 12(15 wt. %) and ionomer(85 wt. %) | composite of carbon fiber/carbon fiber prepreg | FIG. 17 | 2.0-3.0 Kg | less than 0,01 dB | less than 0,04 dB | less than 0,02 dB | less than 0,02 dB | less than 0,02 dB |
| 16 | polyethylene | mixture of nylon 12(15 wt. %) and ionomer(85 wt. %) | composite of carbon fiber/polyimide resin | — | 2.0-3.0 Kg | less than 0,01 dB | less than 0,04 dB | less than 0,02 dB | less than 0,02 dB | less than 0,02 dB |
| 17 | polyethylene | mixture of nylon 12(15 wt. %) and ionomer(85 wt. %) | carbon fiber impregnated and fixed with silane coupling agent | — | 2.0-3.0 Kg | less than 0,01 dB | less than 0,04 dB | less than 0,02 dB | less than 0,02 dB | less than 0,02 dB |
| 18 | polyethylene | mixture of nylon 12(15 wt. %) and ionomer(85 wt. %) | carbon fiber fixed with inorganic adhesive | — | 2.0-3.0 Kg | less than 0,01 dB | less than 0,04 dB | less than 0,02dB | less than 0,02 dB | less than 0,02 dB |

Note
1 acrylic acid-grafted product of ethylene-ethyl acrylate copolymer
2 from −40° C. to +70° C.
3 from −20° C. to +60° C., 6 hours per cycle, after 120 cycles
4 80° C., after 30 days
5 60° C., 95% RH, after 30 days

EXAMPLE 18

A protective packaging assembly different from the packaging assembly of FIG. 13 as used in Example 10 only in that a rod (length: 60 mm, diameter: 1.0 mm) of carbon fiber yarn (12,000 filaments) fixed together with sumiceram (tradename of an inorganic adhesive manufactured by Sumitomo Chemical Co., Ltd., Japan) was used as the base electrical resistance heating element instead of the carbon-carbon fiber composite rod.

The spliced portion of an optical fiber packaged in this Example in the same manner as in Example 11 (reinforced unit) had excellent properties as shown in Table 2.

Figure 19:
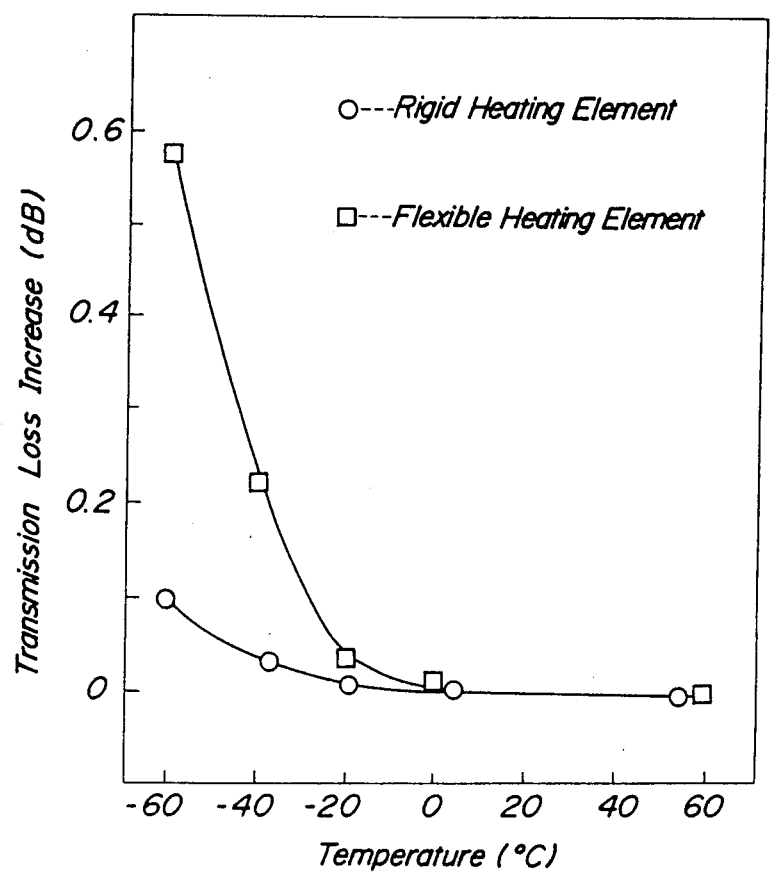
FIG. 19 is a graph showing the transmission loss increase (dB/spliced portion) with temperature decrease of the splice packaged with a rigid electrical resistance heating element in comparison with that packaged with a flexible electrical resistance heating element employed in the protective packaging assemblies.

Just as demonstrated in Example 1, it is also apparent from Examples 10 to 18 that, according to the present invention, the protective packaging can be easily and safely carried out in a short period of time only by supplying an electric current through the electrical resistance heating element without using any external heater. In every one of Examples 10 to 18, with the use of the rigid electrical resistance heating element having a high flexural strength, a high flexural modulus of elasticity and low linear expansion coefficient and the use of the hot-melt adhesive having a sufficient adhesive to the secondary nylon coating of the optical fiber, a highly reliable reinforced unit could be formed which advantageously gave rise to substantially no breaking of If a non-rigid or flexible electrical resistance heating element is used, for example, in a packaging assembly as shown in FIG. 13, bending of the spliced portion of an optical fiber packaged by the assembly may occur because of the contraction of a heat-shrinkable tube and a hot-melt adhesive during the course of cooling, leading to microbending of an optical fiber which will result in increased transmission loss of the optical fiber as shown in FIG. 19 and/or breaking of the fiber. In FIG. 19, the symbols ○ and □ indicate transmission loss increases, dependent on temperature, of optical fibers packaged by packaging assemblies including a rigid heating element and a flexible heating element, respectively.

Figure 20:
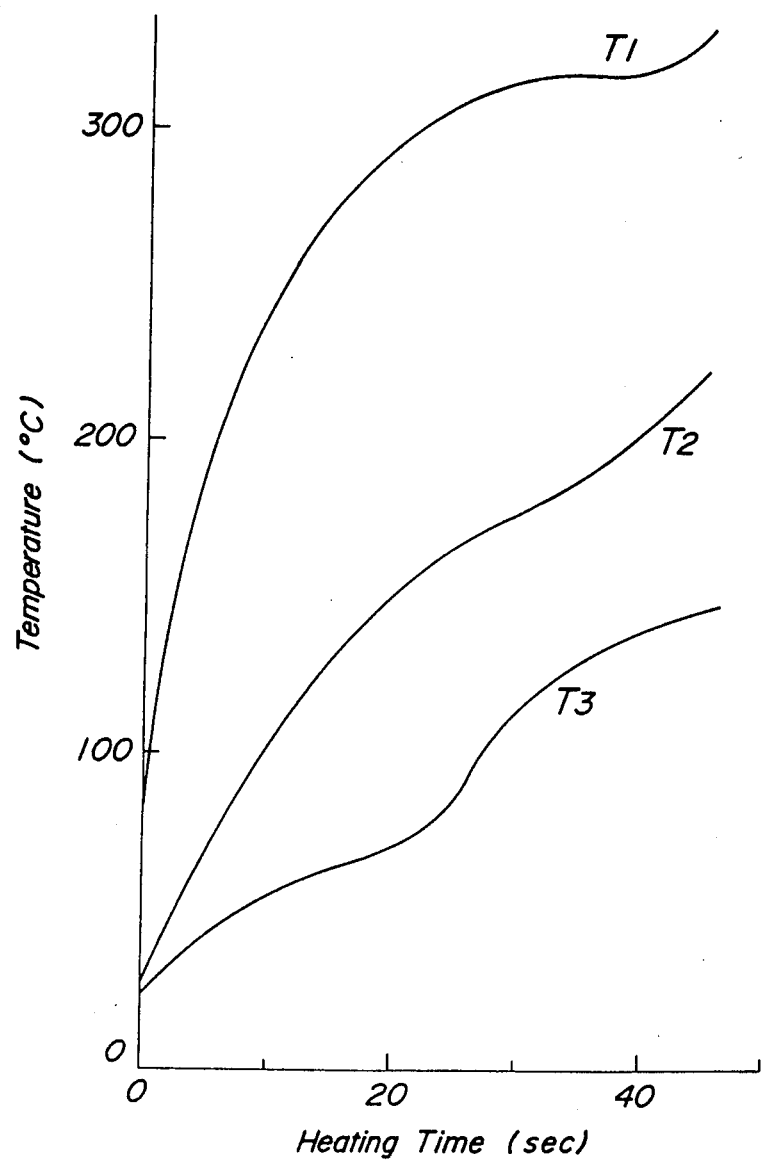
FIG. 20 is a graph showing the temperature increases at the package interfaces internally heated by electrical resistance heating element.

In the protective packaging assembly of FIG. 13, the temperatures $T_1$, $T_2$ and $T_3$ of the electrical resistance heating element 53, the space on the inner side of the hot-melt adhesive tube 52 and the heat-shrinkable tube 51, respectively, during the course of packaging vary with heating period of time as is shown in FIG. 20. The temperature $T_1$ of the heating element 53 is desired to be increased to at least 300° C. for melting the hot-melt adhesive tube 52 to integrate the packaging assembly with the spliced portion of an optical fiber. At temperatures of 300° C. or more, as regards the heating element, gases may be formed by the decomposition of impurities thereof and air in the space therearound may be heat-expanded, contributing to possible formation and retention of bubbles in the reinforced unit in addition to bubbles that may be formed by any absorbed water in the heating element. As regards the hot-melt adhesive tube, any absorbed water therein may add to the possibility of formation and retention of bubbles in the reinforced unit. Such residual bubbles leads to a likelihood of optical fiber protrusion breaking and transmission loss change with temperature a decrease in.

An embodiment of the present invention which provides a reinforced unit having little possibility of bubble formation and retention will be explained as follows. A protective packaging assembly according to this embodiment before resistance heating has a structure as shown together with an optical fiber having a spliced portion to be reinforced in the cross-sectional view of FIG. 21A and the longitudinally sectional view of FIG. 21B. The protective packaging assembly consists of a heat-shrinkable tube 91, a hot-melt adhesive tube 92 having an equilibrium water absorption of 1.0% by weight or less in 23° C. water, and an electrical resistance heating element 93 made of a carbon fiber composite having a flexural strength of 10 kg/mm$^2$ or more, a flexural modulus of elasticity of 1 ton/mm$^2$ or more, an equilibrium water absorption of 1.0% or less in 23° C. 100%RH, a weight loss rate of 0.01% per minute as measured in 500° C. air after being dried and a density of 1.8 g/cm$^2$ or more in a matrix of carbon. The hot-melt adhesive tube 92 provides a space through which the optical fiber can be passed.

Figure 21:
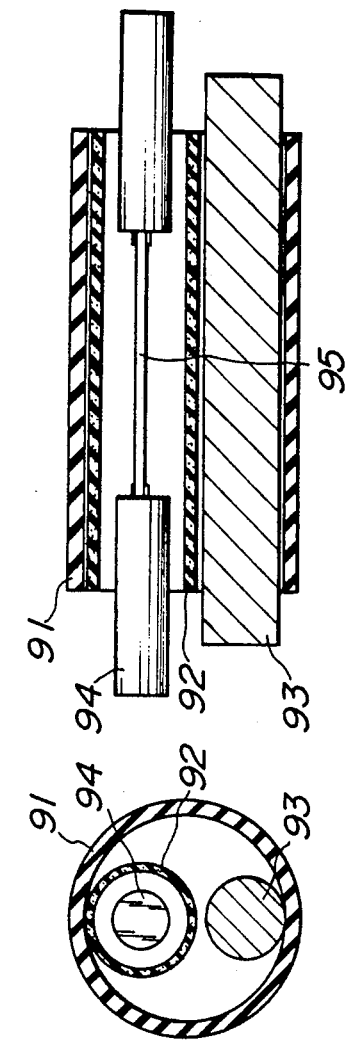
FIGS. 21A and 21B are cross-sectional and longitudinally sectional views showing the arrangement of a protective packaging assembly of the present invention and an optical fiber having a spliced portion about to be packaged.

As is shown in FIGS. 21A and 21B, the protective packaging assembly, through the space of the hot-melt adhesive tube 92 of which the optical fiber has been passed, is placed around the spliced portion 95 of the optical fiber 94. When electricity is supplied through the heating element 93 to effect heating from inside the packaging assembly, the hot-melt adhesive tube 92 is molten while the heat-shrinkable tube 91 is shrunken, whereby the spliced portion 95 of the optical fiber is integrated with the heating element 93, the shrunk tube 91 and the adhesive tube 92 as is shown in the cross-sectional view of FIG. 22A and the longitudinally sectional view of FIG. 22B.

As the material of the heat-shrinkable tube to be used in this embodiment, there can be mentioned, for example, polyolefins such as polyethylene, polypropylene, ethylene-propylene copolymers, polyvinyl chloride, fluoropolymers such as polyvinylidene fluoride, and silicone resins, to which the material employable is not particularly limited.

As the material of the hot-melt adhesive to be used in this embodiment, there can be mentioned, for example, polyolefins, polyamides, polyvinyl chlorides, polyesters, polyvinyl acetals, polyurethanes, polystyrenes, acrylic resins, polyvinyl esters, fluorocarbon resins, polyethers, polyacetals, polycarbonates, polysulfones, diene polymers, natural rubber, chloroprene rubbers, polysulfides, and modified products thereof. They may be used either alone or in mixture. The hot-melt adhesive material having an equilibrium water absorption of 1.0% by weight or less, if used in the protective packaging assembly, forms substantially no bubbles from any air-originated moisture contained therein.

The carbon-carbon fiber composite that may be used as the electrical resistance heating element in this embodiment is one prepared by impregnating a bundle of carbon fiber yarns with a resin such as a furfuryl alcohol resin or a phenol resin and heating in an inert atmosphere such as argon gas at 800° to 1,000° C. to carbonize the resin, the impregnation and carbonization being repeated.

If a carbon-carbon fiber composite having a flexural strength of less than 10 kg/mm$^2$ is used in the protective packaging assembly, the assembly may sometimes be broken during handling thereof. In this sense, a carbon-carbon fiber composite having a flexural strength of at least 10 kg/mm$^2$ is used in this embodiment. If a carbon-carbon fiber composite having a flexural modulus of elasticity of less than 1 ton/mm$^2$ is used in the packaging assembly, bending of an optical fiber in the reinforced, spliced portion thereof may be brought about upon solidification of the hot-melt adhesive and cooling of the heat-shrinkable tube during the course of packaging as shown in FIGS. 21A and 21B and in FIGS. 22A and 22B, often resulting in an increased transmission loss of the optical fiber caused by the packaging procedures as is shown in Table 3 in comparison of Example 22 with Examples 19 to 21. In this sense, a carbon-carbon fiber composite having a flexural strength of at least 1 ton/mm$^2$ was used in this embodiment.

EXAMPLES 19 TO 22

Protective packaging assemblies as shown in FIGS. 21A and 21B, in which carbon-carbon fiber composites having varied flexural moduli of elasticity were respectively used, were employed in these Examples.

Figure 22:
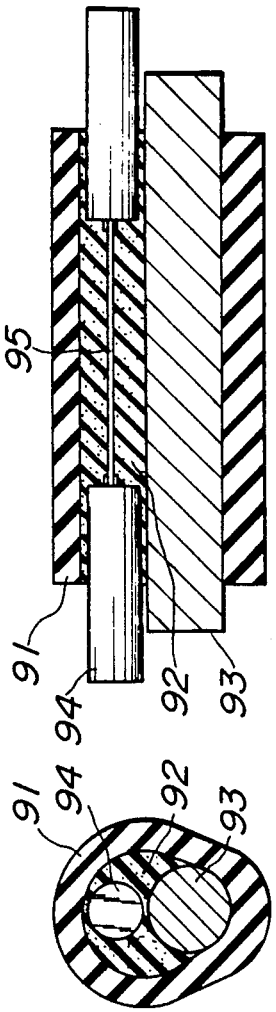
FIGS. 22A and 22B are cross-sectional and longitudinally sectional views showing the structure of a reinforced unit formed from the arrangement of FIGS. 21A and 21B after resistance heating.

The materials of the packaging assemblies and the results as to reinforced units formed therefrom in the same manner as shown in FIGS. 22A and 22B are listed in Table 3.

TABLE 3

| | Example 19 | Example 20 | Example 21 | Example 22 |
|---|---|---|---|---|
| Reinforcement Assembly | | | | |
| Heat-Shrinkable Tube | crosslinked low density polyethylene (inner diameter: 3.2mm, thickness: 0.25 mm length: 50 mm) | | | |
| Hot-Melt Adhesive Tube | ionomer (inner diameter: 1.5 mm, thickness: 0.2 mm, length: 50 mm) | | | |
| Electrical Resistance Heating Element | carbon-carbon fiber composite (diameter: 1.3 mm, length: 70 mm, both 15mm-long end portions coated with Ag paste) | | | |
| Sectional View | FIGS. 21A and 21B, and FIGS. 22A and 22B | | | |
| Resistance Heating Conditions During Reinforcement | approximately 2V × 3A × 40 seconds | | | |
| Flexural Modulus of Elasticity of Composite | 14 tons/mm$^2$ | 3 tons/mm$^2$ | 1.5 tons/mm$^2$ | 0.7 ton/mm$^2$ |
| Bending of Reinforced Portion | no | no | no | blended |
| Transmission Loss Increase with Decreasing Temperature (+20° C. → −20° C.) | 0.03dB/spliced portion | 0.03dB/spliced portion | 0.05dB/spliced portion | 0.5dB/spliced portion |

EXAMPLES 19 AND 23 TO 26

Protective packaging assemblies as shown in FIGS. 21A and 21B, in which carbon-carbon fiber composites having a varied equilibrium water absorption in 23° C. 100%RH were respectively used, were employed in these Examples.

The materials of the protective packaging assemblies and the results as to reinforced units formed therefrom in the same manner as shown in FIGS. 22A and 22B are listed in Tabel 4, in which "Example 19" indicates the same packaging assembly as listed in Table 3.

In every one of Examples 19, 23 and 24, since a composite having an equilibrium water absorption of below 1.0% by weight in 23° C. 100%RH was used, substantially no bubbles were formed during the course of packaging and, hence, the transmission loss increase of an optical fiber with temperature lowering from +20° C. to −20° C. was as small as 0.03 dB per spliced portion. On the other hand, in each of Examples 25 and 26, bubbles which might originate from water absorbed in a composite having an equilibrium water absorption of above 1% by weight in 23° C. 100%RH were formed during the course of packaging and, hence, the transmission loss increase of an optical fiber with temperature lowering from +20° C. to −20° C. was 0.12 dB or more per spliced portion. Therefore, it will be easily understood that it is preferable to use a carbon-carbon fiber composite having an equilibrium water absorption of 1.0% by weight or less in 23° C. 100%RH.

after dried were respectively used, were employed in these Examples. The measurement of weight loss rates was carried out by using a thermogravimetric analysis(TGA) apparatus.

The materials of the protective packaging assemblies and the results as to reinforced units formed therefrom in the same manner as shown in FIGS. 22A and 22B are listed in Table 5, in which "Example 19" indicates the same packaging assembly as listed is Table 3.

In the case of each of the protective packaging assemblies of Examples 27 and 28 using a composite having a weight loss rate of more than 0.01%/minute as measured in 500° C. air after dried, a small amount of white smoke believed to be a decomposition gas originating from the impurities of the composite was observed during the course of packaging, and some bubbles were left in the reinforced unit. Furthermore, in each of Examples 27 and 28, the transmission loss increase of an optical fiber with temperature lowering from +20° C. to −20° C. was above 0.1 dB per spliced portion. Therefore, it is preferable to use a carbon-carbon fiber composite having a weight loss rate of 0.01% /minute or less as measured in 500° C. air after dried.

TABLE 5

| | Example 19 | Example 27 | Example 28 |
|---|---|---|---|
| Reinforcement Assembly | | | |
| Heat-Shrinkable Tube | crosslinked low density polyethylene (inner diameter: 3.2 mm, thickness: 0.25 mm length: 50 mm) | | |
| Hot-Melt Adhesive Tube | ionomer (inner diameter: 1.5 mm, thickness: 0.2 mm, length: 50 mm) | | |
| Electrical Resistance Heating Element | carbon-carbon fiber composite* (diameter: 1.3 mm, length: 70 mm, both 15mm-long end portions coated with Ag paste) | | |
| Sectional View | FIGS. 21A and 21B, and FIGS. 22A and 22B | | |
| Resistance Heating Conditions During Reinforcement | approximately 2V × 3A × 40 seconds | | |
| Weight Loss Rate in 500° C. Air | less than 0.01%/min. | 0.02%/min. | 0.08%/min. |
| Formation of Bubbles | no | formed | formed |
| Transmission Loss Increase with Decreasing Temperature (+20° C. → −20° C.) | 0.03dB/spliced portion | 0.13dB/spliced portion | 0.13 dB/spliced portion |

Note
*after dried under vacuum

EXAMPLES 19 AND 29 TO 33

Protective packaging assemblies as shown in FIGS.

TABLE 4

| | Example 19 | Example 23 | Example 24 | Example 25 | Example 26 |
|---|---|---|---|---|---|
| Reinforcement Assembly | | | | | |
| Heat-Shrinkable Tube | crosslinked low density polyethylene (inner diameter: 3.2 mm, thickness: 0.25 mm length: 50mm) | | | | |
| Hot-Melt Adhesive Tube | ionomer (inner diameter: 1.5 mm, thickness: 0.2 mm, length: 50 mm) | | | | |
| Electrical Resistance Heating Element | carbon-carbon fiber composite*(diameter: 1.3 mm, length: 70 mm, both 15mm-long end portions coated with Ag paste) | | | | |
| Sectional View | FIGS. 21A and 21B, and FIGS. 22A and 22B | | | | |
| Resistance Heating Conditions During Reinforcement | approximately 2V × 3A × 40 seconds | | | | |
| Equilibrium Water Absorption of Composite in 23° C. 100% RH | 0.2 wt. % | 0.3 wt. % | 0.6 wt. % | 1.3 wt. % | 5 wt. % |
| Formation of Bubbles | no | no | no | formed | formed |
| Transmission Loss Increase with Decreasing Temperature (+20° C. → −20° C.) | 0.03dB/ spliced portion | 0.03dB/ spliced portion | 0.03dB/ spliced portion | 0.12dB/ spliced portion | 0.15db/ spliced portion |

Note
*after allowed to stand in a room for one month

EXAMPLES 19, 27 AND 28

Protective packaging assemblies as shown in FIGS. 21A and 21B, in which carbon-carbon fiber composites having varied weight loss rate as measured in 500° C. air 21A and 21B, in which hot-melt adhesive having a varied equilibrium water absorption in 23° C. water were respectively used, were employed in these Examples.

The materials of the packaging assemblies and the results as to reinforced units formed therefrom in the same manner as shown in FIGS. 22A and 22B are shown in Tabel 6, in which "Example 19" indicates the same packaging assembly as listed in Table 3.

In the case of every one of the packaging assemblies of Examples 19 and 29 to 31 using a hot-melt adhesive having an equilibrium water absorption of less than 1.0% by weight in 23° C. water, substantially no bubbles were formed during the course of packaging. On the other hand, in the case of each of the packaging assemblies of Examples 32 and 33 using a hot-melt adhesive having an equilibrium water absorption of above 1.0% by weight in 23° C. water, some bubbles were formed and, hence, the transmission loss increase of an optical fiber with decreasing temperature from +20°C. to −20° C. was 0.1 dB per spliced portion. Therefore, it is preferable to use a hot-melt adhesive having a water absorption under saturation of 1.0% by weight or less in 23° C. water.

Figure 23:
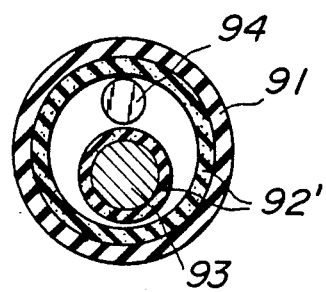
FIGS. 23 and 24 are cross-sectional views respectively showing two additional embodiments of the present invention together with an optical fiber.
Figure 24:
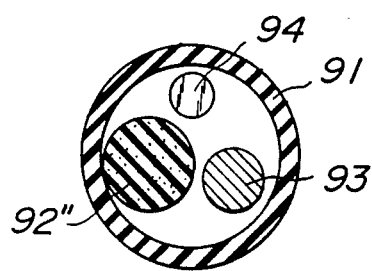

21B. The protective packaging assembly of FIG. 23 used in Example 34 consisted of a heat-shrinkable tube 91, and a layer of a hot-melt adhesive 92' adhered to the inner surface of the tube 91, and an electrical resistance heating element 93 having therearound the layer of the hot-melt adhesive 92' and disposed in the space surrounded by the hot-melt adhesive layer present on the inner surface of the heat-shrinkable tube 91, through which space an optical fiber 94 was passed as is shown in FIG. 23. The packaging assembly of FIG. 24 used in Example 35 consisted of a heat-shrinkable tube 91, and a rod of a hot-melt adhesive 92'' and an electrical resistance heating element 93 which were disposed on the inner side of the tube 91 as is shown in FIG. 24.

The materials of the protective packaging assemblies and the results as to reinforced units formed therefrom in substantially the same manner as shown in FIGS. 22A and 22B are shown in Table 7.

Every reinforced unit showed excellent properties; tensile strength: 2.5 kg to 3.5 kg, transmission loss increase by reinforcement: below 0.01 dB per spliced portion, temperature dependence of transmission loss

TABLE 6

|  | Example 19 | Example 29 | Example 30 | Example 31 | Example 32 | Example 33 |
|---|---|---|---|---|---|---|
| Reinforcement Assembly |  |  |  |  |  |  |
| Heat-Shrinkable Tube | crosslinked low density polyethylene (inner diameter: 3.2 mm, thickness: 0.25 mm length: 50mm) | | | | | |
| Hot-Melt Adhesive Tube* | ionomer | EVA** | ionomer/nylon 12 = 85/15 by weight | ionomer/nylon 12 = 50/50 by weight | ionomer/nylon 12 = 30/70 by weight | nylon 12 |
| Electrical Resistance Heating Element | carbon-carbon fiber composite (diameter: 1.3 mm, length: 70 mm, both 15mm-long end portions coated with Ag paste) | | | | | |
| Section View | FIGS. 21A and 21B, and FIGS. 22A and 22B | | | | | |
| Resistance Heating Conditions During Reinforcement | approximately 2V × 3A × 40 seconds | | | | | |
| Equilibrium Water Absorption in 23° C. water | 0.09 wt. % | 0.10 wt. % | 0.3 wt. % | 0.8 wt. % | 1.1 wt. % | 1.5 wt. % |
| Formation of Bubbles | no | no | no | no | formed | formed |
| Transmission Loss Increase with Decreasing Temperature (+20° C. → −20° C.) | 0.03/dB spliced portion | 0.03dB/ spliced portion | 0.03dB/ spliced portion | 0.03dB/ spliced portion | 0.1dB/ spliced portion | 0.15dB/ spliced portion |

Note
*inner diameter: 1.5mm, thickness: 0.2mm, length: 50mm, after allowed to stand in a room for one month
**ethylene-vinyl acetate copolymer

EXAMPLES 19, 34 AND 35

Protective packaging assemblies as shown in FIGS. 23 and 24 were employed in these Examples together with the same packaging assembly as used in the preceding Example 19 and as shown in FIGS. 21A and change (−60° C. to +70° C.): 0.06 to 0.10 dB per spliced portion, and transmission loss increases after a heat cycle test, a high temperature shelf test and a high temperature and high humidity shelf test: all below 0.02 dB per spliced portion.

TABLE 7

|  | Example 19 | Example 34 | Example 35 |
|---|---|---|---|
| Reinforcement Assembly |  |  |  |
| Heat-Shrinkable Tube* | crosslinked low density polyethylene |  | crosslinked high density polyethylene |
| Hot-Melt Adhesive Tube* |  | ionomer |  |
| Electrical Resistance Heating Element* |  | composite |  |
| Sectional View | FIGS. 21A and 21B, and FIGS. 22A and 22B | FIG. 23 | FIG. 24 |
| Resistance Heating Conditions During Reinforcement | approximately 2V × 3A × 40 seconds | | |
| Properties of Reinforced Unit (per spliced portion) |  |  |  |
| Tensile Strength | 2.5–3.5 Kg | 2.5–3.5 Kg | 2.5–3.5 Kg |
| Transmission Loss Change Reinforcement | less than 0.01dB | less than 0.01dB | less than 0.01dB |
| Temperature Dependence (−60° C.−+70° C.) | 0.06dB | 0.10dB | 0.09dB |
| Heat Cycle Test (−20° C.−+60° C., 6 hours | less than 0.02dB | less than 0.02dB | less than 0.02dB |

TABLE 7-continued

|  | Example 19 | Example 34 | Example 35 |
| --- | --- | --- | --- |
| per cycle, after 120 cycles) | | | |
| High Temp. Test | | | |
| less than 0.02dB | less than 0.02dB | less than 0.02dB | |
| 80° C., after 30 days | | | |
| High Temp. and High Humidity | less than 0.02dB | less than 0.02dB | less than 0.02dB |
| Test | | | |
| (60° C., 95% RH, after 30 days) | | | |

Note
*shape and dimensions: the same as in Table 6

As is apparent from Examples 19 to 35, when a carbon-carbon fiber composite resistance heating element having a flexural strength of 10 kg/mm² or more, a flexural modulus of elasticity of 1 ton/mm² or more, an equilibrium water absorption of 1.0% by weight or less in 23° C. 100%RH and a weight loss rate of 0.01%/minute or less as measured in 500° C. after dried, and a hot-melt adhesive having an equilibrium water absorption of 0.01% by weight or less in 23° C. water are used in the protective packaging assembly according to the present invention, a highly reliable reinforced unit is formed which advantageously contains substantially no residual bubbles and, hence, gives rise to little breaking of an optical fiber and to reduced transmission loss change of the fiber dependent on temperature change.

In the case where the melting point of the hot-melt adhesive is lower than the shrinkage temperature of the heat-shrinkable tube, the hot-melt adhesive is molten before shrinkage of the heat-shrinkable tube in the course of the integration by heating the packaging assembly with the spliced portion of an optical fiber to entangle air therein, which cannot subsequently be squeezed out in some cases to form the residual bubbles in the resulting reinforced unit even when the electrical resistance heating element has a characteristic resistance distribution such as the distribution I or II as shown in FIG. 10A. On the other hand, in general, hot-melt adhesive resins having an excellent adhesion to nylon that is generally used as a material of the plastic coating on a bare optical fiber have a large polarity and, hence, a high water absorption. Therefore, the use of one of such resins may often result in formation of bubbles originating from the absorbed water during heating. Any residual bubbles in the resulting reinforced unit may give rise to protrusion and, hence, breaking of an optical fiber in the bubbled area of the unit upon temperature change as well as to transmission loss change of the fiber upon temperature change.

An embodiment according to the present invention, in which the above points are taken into consideration, will be explained with reference to FIGS. 25A and 25B and to FIGS. 26A and 26B.

FIGS. 25A and 25B are the cross-sectional and longitudinally sectional views, respectively, of a protective packaging assembly according to the present invention, in which an optical fiber is insertedly disposed. The protective packaging assembly consists of a heat-shrinkable tube 101 capable of shrinking in the radial direction thereof upon heating, a tube 102 of a hot-melt adhesive disposed on the inner side of the tube 101 and having a melting point higher than the shrinkage temperature of the heat-shrinkable tube 101 and an equilibrium water absorption of 1.0% by weight or less in 23° C. water, a rod of an electrical resistance heating element 103 disposed between the tubes 101 and 102 and extendedly in the axial direction of the tubes. Both the end portion of the heating element 103 are coated with a conductive paste to obtain a characteristic resistance distribution I as shown in FIG. 10A. The tube 102 provides a space 109 through which an optical fiber can be passed.

The packaging procedures using the above-mentioned protective packaging assembly will be explained with reference to FIGS. 25A and 25B and to FIGS. 26A and 26B. One optical fiber was insertedly passed through the space 109 of the packaging assembly and moved away from the fusion area. The optical fiber and another optical fiber with their end portions stripped off the plastic coatings 108 to expose their bare fibers 107 was fusion-spliced in an end-to-end position. The protective packaging assembly, through the space 109 of which the optical fiber had been passed before the fusion splicing as described above, was so placed around the fusion-spliced portion 107A of the optical fiber as to cover the bare fiber 107 and parts of the plastic coatings 108 adjacent to both ends of the bare fiber portion. Both of the ends of the electrical resistance heating element 103 are electrically connected to a constant voltage source 111 such as a storage battery or an dry cell through a switch 112. Upon the application of electric power, the electrical resistance heating element 103 generates heat, which raised the temperature of the heat-shrinkable tube 101 as well as the hot-melt adhesive tube 102 rapidly in their central portions and slowly in their end portions. Thus, the heat shrinkage of the heat-shrinkable tube 101 in the radial direction develops from the central portion to the end portions of the tube 101, and the melting of the hot-melt adhesive tube 102 develops from the central portion to the end portions with a little time lag behind the corresponding develpment of shrinkage of the tube 101 to form an adhesive layer which completely surroundingly adheres to and fixes the bare optical fiber 107. Thus, a reinforced unit is formed which includes the spliced portion of the optical fiber and the electrical resistance heating element with the hot-melt adhesive acting as something like a sealant inside the heat-shrunk tube.

As described above, according to this embodiment, since the melting of the hot-melt adhesive tube 102 develops upon resistance heating from the center portion to both the end portions with a little time lag behind the corresponding development of shrinkage of the heat-shrinkable tube 101 from the central portion to both the end portions, air remaining between the optical fiber cores 107 and the molten adhesive tube 102, and between the heating element 103 and the heat-shrinkable tube 101 is easily squeezed out and completely removed from the resulting reinforced unit.

EXAMPLES 36 AND 37

In the protective packaging assembly as shown in FIGS. 25A and 25B, a low density polyethylene tube having a shrinkage temperature of 115° C., a length of 6 cm, and inner diameter of 3.2 mm, a thickness of 0.2 mm was used as the heat-shrinkable tube 101, a modified polypropylene tube having a melting point of 160° C., a length of 6 cm, an inner diameter of 1.2 mm and a thickness of 0.2 mm was used as the hot-melt adhesive tube 102, and a carbon fiber-reinforced carbon composite having a length of 7 cm and a diameter of 1.4 mm and coated in both the 3 cm-long end potions thereof with an Ag paste 104 was used as the electrical resistance heating element 103. This packaging assembly was of Example 36.

The protective packaging assembly, through the space 109 of the hot-melt adhesive tube 102 of which an optical fiber was passed, was so placed around the spliced portion 107A of the fiber as to cover the bare fiber 107 and parts of the plastic coating 108 adjacent to both the ends of the bare fiber portion. When a DC voltage of 2 V was applied across the ends of the heating element 103, the development of shrinkage of the heat-shrinkable tube 101 from the central portion to the end portions was completed in a period of 30 seconds, followed by the corresponding development, with a little time lag, of melting of the hot-melt adhesive tube 102 from the central portion to both the end portions to form a hot-melt adhesive layer 105 with complete removal of air from the resulting reinforced unit. The transmission loss change of the optical fiber due to the packaging was below 0.01 dB per spliced portion. After 100 cycles in a heat cycle test(+20° C. to +60° C., .6 hours per cycle), no breaking of the optical fiber was observed and the transmission loss change of the fiber was below 0.02 dB per spliced portion. The transmission loss change of the optical fiber after a 30 days' high temperature and high humidity test(85° C., 95%RH) was below 0.02 dB per spliced portion.

On the other hand, a protective packaging assembly different from the assembly of Example 36 only in that an ethylene-vinyl acetate copolymer tube having a melting point of 69° C., a length of 6 cm, an inner diameter of 1.5 mm and a thickness of 0.2 mm was used as the hot-melt adhesive tube instead of the modified polypropylene tube was used in Example 37 for the packaging of an optical fiber in substantially the same manner as described with respect to the assembly of Example 36. The melting of the ethylene-vinyl acetate copolymer hot-melt adhesive tube 102 developed from the central portion to both the end portions upon resistance heating before the corresponding development of shrinkage of the heat-shrinkable tube 101 from the central portion to both the end portions thereby to tend to entangle air in the adhesive layer 105. Any entangled air was not completely squeezed out or removed from the resulting reinforced unit thereby to tend to remain as residual bubbles therein. The transmission loss change of the optical fiber in the reinforced unit with the residual bubbles after the same heat cycle test as carried out in Example 36 was 0.1 dB per spliced portion.

It will be easily understood from the above that the use of a hot-melt adhesive tube having a melting point higher than the shrinkage temperature of the heat-shrinkable tube is preferable and advantageous in the present invention.

EXAMPLES 38 TO 46

Protective packaging assemblies using the same electrical resistance heating element as used in Examples 36 and 37 and materials as listed in Table 8 was used in these Examples for the packaging of optical fibers in substantially the same manner as described in Examples 36 and 37. The results are shown together with the results of Example 37 in Table 9.

In everyone of Examples 37 and 41 to 44 wherein a hot-melt adhesive having a melting point higher than the shrinkage temperature of the heat-shrinkable tube was used, the melting of the hot-melt adhesive tube developed from the central portion to both the end portions upon resistance heating before the corresponding development of shrinkage of the heat-shrinkable tube from the central portion to both the end portions thereby tends to entangle air in the adhesive layer. Any entangled air was not completely squeezed out or removed from the resulting reinforced unit thereby tending tend to remain as residual bubbles therein. In each of Examples 45 and 46 wherein a hot-melt adhesive having an equilibrium water absorption of above 1.0% by weight in 23° C. water was used, some bubbles originating from water absorbed in the adhesive were formed and remained in the resulting reinforced unit. In every one of Examples 38 to 40 wherein a hot-melt adhesive having a melting point higher than the shrinkage temperature of the heat-shrinkable tube and an equilibrium water absorption of less than 1.0% by weight in 23° C. water was used, no residual bubbles were observed in the resulting reinforced unit.

TABLE 8

| | | | Heat-Shrinkable Tube | |
|---|---|---|---|---|
| Hot-Melt Adhesive Tube | | | Low Density | High Density |
| Material | Melting Point (°C.) | Water Absorption (1) (wt. %) | Polyethylene (115° C.) (2) | Polyethylene (125° C.) (2) |
| ethylene-vinyl acetate copolymer | 69 | 0.05 | Example 37 | Example 41 |
| ionomer A (3) | 99 | 0.089 | Example 42 | — |
| ionomer B (4) | 99 | 0.16 | Example 43 | — |
| blend of nylon 12 and ionomer B (5) | — | 0.80 | Example 44 | — |
| and ionomer B (6) | — | 1.1 | Example 45 | — |
| nylon 12 | 185 | 1.5 | Example 46 | — |
| modified polypropylene (7) | 160 | 0.02 | Example 38 | Example 39 |
| polypropylene | 160 | less than 0.02 | Example 40 | — |

Note
(1) equilibrium water absorption in 23° C. water
(2) shrinkage temperature
(3) Hi-milan 6004 (tradename of product manufactured by Mitsui Polychemicals Company, Ltd., Japan)
(4) Hi-milan 1652 (tradename of a product manufactured by MitsuiPolychemicals Company, Ltd., Japan)
(5) nylon 12/ionomer B = 50/50
(6) nylon 12/ionomer B = 70/30
(7) maleic anhydride-grafted polypropylene

TABLE 9

| Example No. | Residual Bubbles Between Materials in Reinforced Unit | Bubbles Originating from Water Absorbed in Adhesive* |
|---|---|---|
| 37 | formed | not formed |
| 41 | " | " |
| 42 | " | " |
| 43 | " | " |
| 44 | " | " |
| 45 | not formed | formed |
| 46 | " | " |
| 38 | " | not formed |
| 39 | " | " |

TABLE 9-continued

| Example No. | Residual Bubbles Between Materials in Reinforced Unit | Bubbles Originating from Water Absorbed in Adhesive* |
|---|---|---|
| 40 | " | " |

Note
*Adhesive tubes after allowed to stand in a room for one month were used in reinforcement assemblies.

As is apparent from Tables 8 and 9, according to the embodiment of the present invention wherein a hot-melt adhesive having a melting point higher than the shrinkage temperature of a heat-shrinkable tube and an equilibrium water absorption of 1.0% by weight or less in 23° C. water is used in the packaging assembly comprising an electrical resistance heating element capable of being heated from the central portion to both the end portions, since the melting of the hot-melt adhesive tube develops upon resistance heating from the center portion to both the end portions with a little time lag behind the corresponding development of shrinkage of the heat-shrinkable tube from the center portion to both the end portions besides substantially no bubbles originating from water absorbed in the hot-melt adhesive being formed, air remaining between the bare optical fibers and the molten adhesive tube, and between the heating element and the heat-shrinkable tube is easily squeezed out and completely removed from the resulting reinforced unit. Therefore, a very highly reliable reinforced unit capable of showing excellent temperature characteristics for a long period of time can be simply and speedily formed which advantageously does not give rise to substantial optical fiber protrusion liable to occur in any bubbled area due to the temperature changes, and, hence, minimizes optical fiber breaking and transmission loss change due to temperature change.

What is claimed is:

1. A protective packaging assembly for the spliced portions of optical fibers comprising:
    an electrically insulative heat-shrinkable tube capable of shrinking in the radial direction thereof;
    an extended form of an electrically insulative hot-melt adhesive disposed on the inner side of said heat-shrinkable tube;
    an electrical resistance heating element having an electrical resistance distribution in its axial direction and so disposed on the inner side of said heat-shrinkable tube and extending in the axial direction of said heat-shrinkable tube so as to be capable of heating said heat-shrinkable tube and said extended form of hot-melt adhesive, said heating element being capable of shrinking said heat-shrinkable tube by heat and of melting said extended form of hot-melt adhesive around said spliced portions of said optical fibers; and
    a space provided in said heat-shrinkable tube for allowing the passage of said optical fibers before heating.

2. A protective packaging assembly as claimed in claim 1, wherein said extended form of hot-melt adhesive is a tube providing said space.

3. A protective packaging assembly as claimed in claim 2, wherein said electrical resistance heating element consists of at least one linear part disposed insertedly between said heat-shrinkable tube and said tube of the hot-melt adhesive.

4. A protective packaging assembly as claimed in claim 1, wherein said electrical resistance heating element has a distributed electrical resistance lower in both the end portions thereof than in the central portion thereof, to produce a larger amount of heat in said central portion as compared with that generated in each of said end portions.

5. A protective packaging assembly as claimed in claim 4, wherein said electrical resistance heating element is a rod having an electrical resistance distribution in the axial direction thereof by coating thereon a conductive paste.

6. A protective packaging assembly as claimed in claim 1, wherein said electrical resistance heating element is made of a rigid material having a flexural strength of at least 10 kg/mm$^2$, a flexural modulus of elasticity of at least 1 ton/mm$^2$ and a linear expansion coefficient not greater than $10^{-6}$/°C.

7. A protective packaging assembly as claimed in claim 1, wherein said electrical resistance heating element has at least one part disposed extendedly in the axial direction of said heat-shrinkable tube and having a shape selected from the group consisting of a linear form, a net-like form and a tubular form.

8. A protective packaging assembly as claimed in claim 1, wherein said electrical resistance heating element has a Young's modulus and a linear expansion coefficient substantially equal to those of said optical fiber, and is made of a material including at least one member selected from the group consisting of a nichrome alloy wire, an iron-chrome-aluminum alloy wire, a tungsten wire, a molybdenum wire, a platinum wire, and a material including at least one of a silicon carbide fiber and a carbon fiber.

9. A protective packaging assembly as claimed in claim 1, wherein said hot-melt adhesive is made of at least one member selected from the group consisting of polyolefins, polyamides, polyvinyl chlorides, polyesters, polyvinyl acetals, polyurethanes, polystyrenes, acrylic resins, polyvinyl esters, fluorocarbon resins, polyethers, polyacetals, polycarbonates, polysulfones, diene polymers, natural rubber, chloroprene rubbers, polysulfides, and modified products thereof.

10. A protective packaging assembly as claimed in claim 1, wherein said electrical resistance heating element is made of a sintered carbon material.

11. A protective packaging assembly as claimed in claim 1, wherein said electrical resistance heating element is made of a rigid insulating material having an electrical resistance material fixed therearound.

12. A protective packaging assembly as claimed in claim 1, wherein said electrical resistance heating material is made of a conductive ceramic material.

13. A protective packaging assembly as claimed in claim 1, wherein said electrical resistance heating material is made of a composite of carbon fiber yarns embedded all in one direction in a matrix of a thermoset resin.

14. A protective packaging assembly as claimed in claim 1, wherein said electrical resistance heating element is a rod of carbon fiber yarns fixed with an inorganic material.

15. A protective packaging assembly as claimed in claim 1, wherein said electrical resistance heating element is made of a composite of carbon fibers embedded in a matrix of carbon.

16. A protective packaging assembly as claimed in claim 15, wherein said resin composite has an equilibrium water absorption of 1.0% by weight or less in 23° C. 100%RH and a weight loss rate of 0.01%/minute or less as measured in 500° C. air after dried.

17. A protective packaging assembly as claimed in claim 4, wherein said hot-melt adhesive has a melting point higher than the shrinkage temperature of said heat-shrinkable tube and an equilibrium water absorption of 1.0% by weight or less in 23° C. water.

18. A protective packaging assembly as claimed in claim 17, wherein said hot-melt adhesive is made of at least one member selected from the group consisting of polypropylene and modified products thereof.

19. A protective packaging assembly as claimed in claim 18, wherein said modified products of polypropylene include maleic anhydride-grafted polypropylene and acrylic acid-grafted polypropylene.

* * * * *